US008489492B2

(12) United States Patent
Ravisankar et al.

(10) Patent No.: US 8,489,492 B2
(45) Date of Patent: Jul. 16, 2013

(54) AUTOMATED ENCODING OF INCREMENT OPERATORS

(75) Inventors: Ravi Ravisankar, Austin, TX (US); Roy A. Wood, Jr., Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/080,817

(22) Filed: Apr. 6, 2011

(65) Prior Publication Data

US 2012/0259755 A1  Oct. 11, 2012

(51) Int. Cl.
G06Q 40/00 (2006.01)
(52) U.S. Cl.
USPC ............... 705/37; 705/35; 705/41; 707/693; 709/200; 710/68; 713/198; 726/11
(58) Field of Classification Search
USPC ....................................................... 705/35–45
See application file for complete search history.

(56) References Cited

U.S. PATENT DOCUMENTS

| 4,232,375 | A  | * | 11/1980 | Paugstat et al. ................. 710/68 |
| 6,039,245 | A  |   | 3/2000  | Symonds et al. |
| 6,302,326 | B1 |   | 10/2001 | Symonds et al. |
| 6,671,807 | B1 | * | 12/2003 | Jaisimha et al. ............... 713/193 |
| 6,805,284 | B2 |   | 10/2004 | Himmel et al. |
| 7,627,523 | B1 |   | 12/2009 | Symonds et al. |
| 7,664,857 | B2 |   | 2/2010  | Ovsiannikov et al. |
| 7,752,214 | B2 |   | 7/2010  | Pizzorni et al. |
| 7,779,160 | B1 |   | 8/2010  | Symonds et al. |
| 8,069,102 | B2 | * | 11/2011 | Indeck et al. ................... 705/35 |
| 2001/0029520 | A1 | * | 10/2001 | Miyazaki et al. .............. 709/200 |
| 2010/0049726 | A1 | * | 2/2010  | Yasa et al. ....................... 707/101 |
| 2010/0192215 | A1 | * | 7/2010  | Yaxuan et al. .................. 726/11 |
| 2010/0228668 | A1 | * | 9/2010  | Hogan et al. .................... 705/41 |

FOREIGN PATENT DOCUMENTS
WO     WO 03/100650      * 12/2003

OTHER PUBLICATIONS

Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.*
SIAC; "FAST for OPRA"; Google; Mar. 26, 2007 (13 pages).
FAST Specification; "FIX Protocol Industry-Driven Messaging Standard"; Google; Version 1.x.1; Dec. 20, 2006 (44 pages).
Virat Agarwal et al., "Faster FAST: Multicore Acceleration of Streaming Financial Data"; Google/IBM TJ Watson Ctr.; 2010 (11 pages).

(Continued)

Primary Examiner — Robert Niquette
(74) Attorney, Agent, or Firm — Shumaker & Sieffert, P.A.

(57) ABSTRACT

In one example a method includes: receiving a first input value associated with a first data field; responsive to determining that the first data field is associated with an increment operation, selecting a second input value associated with a corresponding second data field of a previously transmitted message; comparing the first input value and second input value to determine if the first input value includes a sum of the second input value and an increment value; when the first input value includes the sum of the second input value and increment value, generating a message that omits the first input value for the first data field, and providing an operator symbol indicating the increment operation to specify that the first data field of the message is to be associated with the sum of the increment value and second input value of the second data field in the previously transmitted message.

21 Claims, 10 Drawing Sheets

OTHER PUBLICATIONS

Feledy, Z.; "FIXimulator: A Financial Information eXchange Protocol Compliant Sell Side Trading Application"; Google; Feb. 2009 (196 pages).

Lee-et al.; "Automatic Generation Algorithm of FAST Protocol Templates for Efficient Transmission of Financial Data"; Google; pp. 163-164; Dec. 2007-Jan. 2008 (2 pages).

CME Group; "Market Data Platform FIX/FAST—Core Functionality"; Google; Version 2.3; Dec. 8, 2010 (111 pages).

SIAC; "FAST for OPRA"; Google; Jan. 23, 2008 (19 pages).

Google: FAST Version 1.2 Extension Protocol, FIX Protocol Limited; Jan. 18, 2009 (11 pages).

http://fixprotocol.org/discuss/46; "[FIX] Operator Increment, With Presence Bit in PMap Set to 0"; Google; Aug. 24, 2009 (3 pages).

Trevor Blackwell, "Fast Decoding of Tagged Message Formats," IEEE (1996) pp. 224-231.

The FIX Protocol Organization, What is FIX (2001), http://www.fixprotocol.org/what-is-fix.shtml (2 pages).

U.S. Appl. No. 13/080,803, by Ravi Ravisankar, filed Apr. 6, 2011.
U.S. Appl. No. 13/080,825, by Ravi Ravisankar, filed Apr. 6, 2011.
U.S. Appl. No. 13/080,840, by Ravi Ravisankar, filed Apr. 6, 2011.
Office Action from U.S. Appl. No. 13/080,803, dated Aug. 20, 2012, 14 pp.
Amendment in response to Office Action dated Aug. 20, 2012 from U.S. Appl. No. 13/080,803, filed Nov. 19, 2012 (17 pages).
Office Action from U.S. Appl. No. 13/080,825 dated Nov. 13, 2012 (14 pages).
Response to Office Action dated Nov. 13, 2012, from U.S. Appl. No. 13/080,825, filed Feb. 7, 2013, 17 pp.
Ex-Parte Quayle Action from U.S. Appl. No. 13/080,825, dated Feb. 20, 2013, 6 pp.
Office Action from U.S. Appl. No. 13/080,803, dated May 16, 2013 (15 pages).
Amendment from U.S. Appl. No. 13/080,825, filed on Apr. 16, 2013 (10 pages).

* cited by examiner

AUTOMATED ENCODING OF INCREMENT OPERATORS

BACKGROUND

This disclosure relates to data communications, and, in some cases, to high-speed data transmission of financial information.

Computing devices may send and receive messages to communicate information. For example, a message may contain data that represents information to be communicated from one computing device to another. In some examples, computing devices may use a network to exchange messages. In one example, computing devices may exchange messages that include financial information via an electronic securities exchange.

A securities exchange provides securities traders with facilities to buy and sell securities. Securities may include a wide variety of tradable instruments that represent financial value such as stocks, bonds and derivative contracts. Securities exchanges can take many forms. An electronic securities exchange may be implemented by electronic trading software executing on one or more interconnected servers to form an electronic trading system. The electronic trading system may provide a virtual market for traders to buy and sell securities. For example, the electronic trading system may maintain a real-time list of securities available for trading as well as buying and selling prices of the securities. In this way, pricing information of each security may be communicated to buyers and sellers in real-time.

In some examples, a trader may access the electronic securities trading market via a trading application executing on the trader's computing device. The trading application may communicate with the electronic trading system via a network connection such as the Internet or a dedicated high-speed network. Using the trading application, the trader may generate and send messages to the electronic trading system that include instructions to buy or sell securities. A message may specify, for example, a security identifier, a buy or sell price, and/or a quantity of the securities to be purchased or sold. The electronic trading system may receive the message from a trader and execute a buy or sell transaction based on the contents of the message.

BRIEF SUMMARY

In general, this disclosure is directed to compression techniques that may eliminate redundant data in messages encoded according to a messaging protocol without user intervention. For instance, an encoder may receive an input value for a data field. The data field may, in some examples, be associated with a compression technique. In one example, the encoder may, without user intervention, encode the input value in a message using the compression technique when the encoder determines that data of the input value is equivalent to data in a previously transmitted message.

In one example a method includes: receiving, by a computing device, a first input value associated with a first data field; responsive to determining that the first data field is associated with an increment operation, selecting, by the computing device, a second input value associated with a second data field of a previously transmitted message sent from the computing device, wherein the second input field corresponds to the first input field; comparing, by the computing device, the first input value and the second input value to determine if the first input value includes a sum of the second input value and an increment value; and when the first input value includes the sum of the second input value and the increment value, generating, by the computing device, a message including the first data field that omits the first input value for the first data field, and providing, by the computing device, an operator symbol indicating the increment operation to specify that the first data field of the message is to be associated with the sum of the increment value and the second input value of the second data field of the previously transmitted message.

In one example, a computing device includes: an input device to receive a first input value associated with a first data field; one or more processors; and an encoder module executable by the one or more processors to: responsive to determining that the first data field is associated with an increment operation, select a second input value associated with a second data field of a previously transmitted message sent from the computing device, wherein the second input field corresponds to the first input field; compare the first input value and the second input value to determine if the first input value includes a sum of the second input value and an increment value; and when the first input value includes the sum of the second input value and the increment value, generate a message including the first data field that omits the first input value for the first data field, and provide an operator symbol indicating the increment operation to specify that the first data field of the message is to be associated with the sum of the increment value and the second input value of the second data of in the previously transmitted message.

In one example, a computer-readable storage medium encoded with instructions that, when executed, cause one or more processors of a computing device to: receive a first input value associated with a first data field; responsive to determining that the first data field is associated with an increment operation, select a second input value associated with a second data field of a previously transmitted message sent from the computing device, wherein the second input field corresponds to the first input field; compare the first input value and the second input value to determine if the first input value includes a sum of the second input value and an increment value; and when the first input value includes the sum of the second input value and the increment value, generate a message including the first data field that omits the first input value for the first data field, and provide an operator symbol indicating the increment operation to specify that the first data field of the message is to be associated with the sum of the increment value and the second input value of the second data field of the previously transmitted message.

The details of one or more examples of this disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques that may enable a user to efficiently generate and send messages without extensive knowledge of field operators implemented in various messaging protocols. That is, as described herein, techniques are provided to automatically encode data of messages using various compression techniques with minimal or no user intervention. Such techniques may improve user productivity by hiding the complexity of the compression techniques. Furthermore, higher message transmission rates are possible because the compression techniques may be implemented automatically and continuously by an encoder without additional user intervention.

In some examples, messages may be sent from one computing device to another and encoded according to a messaging protocol. A messaging protocol may specify that each message includes one or more data fields. Each data field may store one or more input values. In some examples, a data field of a message may be further associated with a field operator to describe data stored in the input field and/or indicate a compression technique that may be performed on the data field.

In one example, an encoder may receive a current input value to be sent in a data field of a message. The encoder may determine the data field is associated with a field operator. Responsive to determining a field operator is associated with the data field, the encoder may apply a compression technique to the data field that corresponds to the field operator. In one example, the compression technique may cause the encoder to compare the current input value with a previous input value stored by the encoder to determine if the values include equivalent data. The previous input value may correspond to an input value sent in a previously encoded message. If the encoder determines that at least some equivalent data is present, the encoder may generate a message that only includes data of the current input value that differs from the previous input value. The encoder may store this data in the data field of the current message and include metadata in the message that indicates the data comprises the differences between the current input value and the previous value. In this way, redundant data may be removed from messages without user intervention. Various compressions techniques are further described herein, in accordance with aspects of the present disclosure.

Figure 1:
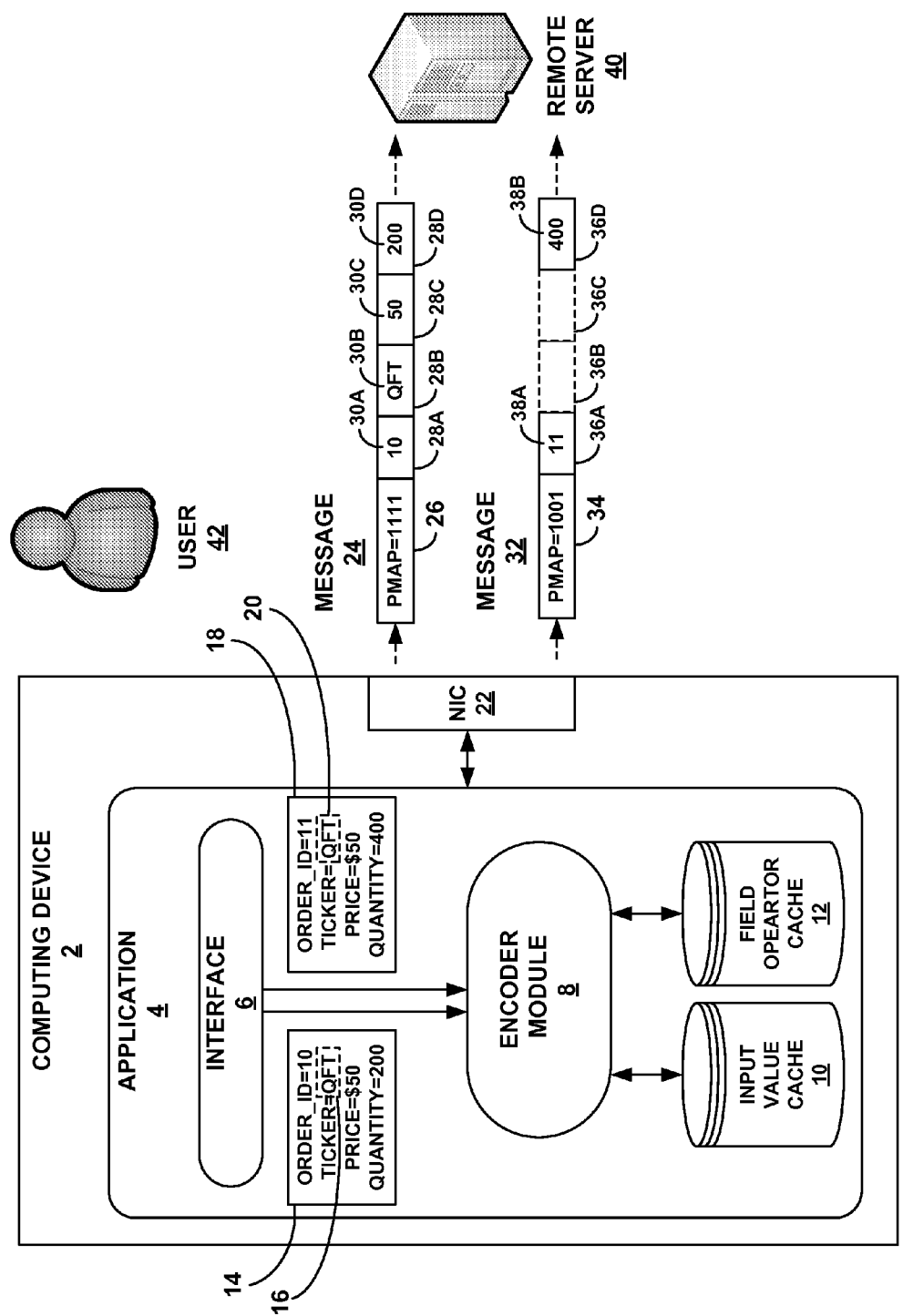
FIG. 1 is a block diagram an example computing device that may implement various encoding techniques, in accordance with one or more aspects of the present disclosure.

FIG. 1 is a block diagram illustrating an example computing device 2 that may implement various encoding techniques, in accordance with one or more aspects of the present disclosure. Computing device 2, in some examples, may include or be a part of a portable computing device (e.g. mobile phone/netbook/laptop/tablet device), desktop computer, or server. As shown in FIG. 1, computing device 2 may execute a application 4 that includes an encoder module 8, input value cache 10, and field operator cache 12. Computing device 2 may also connect to a wired and/or wireless network using a network interface controller (NIC) 22 (see, e.g., FIG. 2). One non-limiting example of computing device 2 is further described in the example of FIG. 2.

As shown in FIG. 1, application 4 may execute on computing device 2. In one example, application 4 may be a trading application to buy and sell securities and/or send and receive market information. In some examples, application 4 may include data and/or instructions to generate, send, and receive messages 24 and 32. Messages 24 and 32 may include input data received via interface 6 from user 42 and/or one or more computing devices. In some examples, interface 6 may be a graphical user interface (GUI) that is displayed by an output device of computing device 2. A GUI may include interactive and/or non-interactive graphical content that presents information of computing device 2 in human-readable form. In some examples a GUI enables user 42 to interact with application 4 using an input device of computing device 2. For example, user 42 may provide input values to application 4 via the GUI using an input device. In response to receiving the input data, application 4 may execute one or more operations. In this way, interface 6 enables user 42 to create, modify, and/or delete data of computing device 2.

In other examples, interface 6 may be an application programming interface (API). An API may include a software interface that provides access to services of application 4. For example, interface 6 may enable application 4 to send and receive data via NIC 22. In other examples, interface 6 may enable application 4 to send and receive data with other applications or modules executing on computing device 2 via interprocess communication (IPC). More generally, interface 6, as shown in FIG. 1, may be any software and/or hardware interface that enables a user, application, and/or computing device to communicate data to and from application 4.

As shown in FIG. 1, application 4 may include an encoder module 8 to generate, encode, and send messages 24, 32 to a remote server 40. Remote server 40, in one example, may comprise an electronic trading system. For example, remote server 40 may execute electronic trading software to provide an electronic securities exchange. Remote server 40 may further include a decoder module to decode encoded messages, e.g., message 24 and 32, as further described herein.

In the example of FIG. 1, encoder module 8 may generate messages 24 and 32. Messages 24 and 32 may, in some examples, include financial data. In one example, encoder module 8 may encode messages 24 and 32 using the Financial Information eXchange (FIX) protocol. The FIX protocol is a widely used industry standard for real-time exchange of financial market data. See, e.g., The FIX Protocol Organization, What is FIX (2001), http://www.fixprotocol.org/what-is-fix.shtml. Although the FIX protocol is an accepted industry standard, it has numerous performance deficiencies. For example, FIX-encoded messages organize data in a self-describing syntax, e.g., <tag>=<value>, which produces large messages and therefore relatively high data overhead. High data overhead is a consequence of self-describing syntax because both a description of the message data and the message data itself must be included in each message.

To reduce message size and data bandwidth, encoder module 8 may encode messages 24 and 32 according to the FIX Adapted for Streaming (FAST) protocol. The FAST protocol employs various optimization techniques to eliminate the data overhead associated with the self-describing syntax of FIX messages. See, e.g., FIX Protocol Organization, FAST Specification (2006), http://www.fixprotocol.org/documents/3066/FAST%20Specification%201%20x%201.pdf.

In one example optimization, the FAST protocol separates the message description from the message data itself. The message description serves as a template from which an encoder may generate corresponding FAST encoded messages that include message data. Consequently, a decoder module may also use the message description to decode FAST messages that are encoded with the message description. Separating the message description from the message data therefore eliminates the need to send the message description in every encoded message. Thus, in some examples, the encoder need only send the message description once to the decoding module prior to decoding encoded messages. In the FAST protocol, a message description may be an Extensible Markup Language (XML) control structure that may include, e.g., a message definition, a definition of the fields of the message, a definition of the data types of each message field, any initial values of an encoded message, etc.

In some examples, a message encoded using the message description may include one or more data fields as specified by the message description. For example, a message description used to encode FAST messages for purchasing securities may specify that an encoded message includes the following data fields: ORDER_ID, TICKER, PRICE, and QUANTITY. Each message encoded according to the message description may therefore include data fields ORDER_ID, TICKER, PRICE, and QUANTITY. In some examples, each data field includes one or more input values. As shown in FIG. 1, fields 30A-30D of message 24 may correspond, respectively, to fields ORDER_ID, TICKER, PRICE, and QUANTITY. ORDER_ID field 28A may store a unique identifier 30A of message 24. TICKER field 28B may store ticker identifier 30B of a security to be purchased. PRICE field 30C may specify a purchase price per security 30C, and QUANTITY field 28D may specify a quantity of the security to purchase 30D. Throughout this disclosure, ORDER_ID, TICKER, PRICE, and QUANTITY, may be used as one non-limiting but illustrative example.

As shown in FIG. 1, messages 24 and 32 may also include presence maps. For example, message 24 includes presence map 26 and message 32 includes presence map 34. A presence map, in some examples, may indicate which message fields of a message include input values. A presence map may also indicate which message fields require additional processing by a decoder module. For example, presence map 26 of message 24 includes the values "1111". The order of the presence map values may correspond to the order of the fields in message 24. For example, the lowest ordered value of presence map 26 may correspond to field 30D. In other examples, the highest ordered value of presence map 26 may correspond to field 30D. In one example, each '1' value of presence map 26 may indicate an input value is stored in the corresponding field. Each '0' value may indicate that a decoder module, upon receipt of the message, may perform additional operations on the corresponding data field. In some examples, a value in a presence map that corresponds to a data field may be referred to as an operator symbol.

The aforementioned concepts may be illustrated in the following non-limiting example use case to generate, encode, and send message 24. In one example, user 42 may be a securities trader who wishes to purchase a specified quantity of a particular security. User 42 may initially execute application 4 on computing device 2. Application 4 may provide a GUI, e.g., interface 6, that enables user 42 to place orders for securities. Using interface 6, user 42 may provide input values that correspond to an order identifier, ticker identifier of the security to be purchased, purchase price per security, and quantity of securities to be purchased. As shown in FIG. 1, a group of input values 14 may include the following input values: an order identifier "10," a ticker identifier "QFT," a price per security "$50," and a quantity of securities "200." The input values may correspond to user 42's desire to purchase 200 shares of security QFT at $50/share. In some examples, group of input values 14 may further include additional data to specify associations between each input value and each data field of a message. This data may be used by encoder module 8 to store each input value in the appropriate data field of a message.

Continuing with the current example use case, encoder module 8 may receive the group of input values 14 from interface 6. In response to receiving the group of input values 14, encoder module 8 may generate a message 24 that includes the input values from group of input values 14. In the current example, message 24 may be encoded according to a message description that is used to encode FAST messages for purchasing securities. Remote server 40 may also have knowledge of the purchasing message description. Using the message description, encoder module 8 may encode message 24 such that ORDER_ID field 28A is associated with input value 30A ("10"), TICKER field 28B is associated with input value 30B ("QFT"), PRICE field 30C is associated with input value 30C ("50") and QUANTITY field 28D is associated with value 30D ("200"). Encoder module 8 may further set presence map 26 to "1111" to indicate that each of fields 28A-28D includes an input value. Message 24 may then be sent from computing device 2 to remote server 40. Remote server 40 may subsequently decode values 30A-30D stored in fields 28A-28D of message 24 using the purchasing message description.

The FAST protocol, in some examples, provides various field operators. Encoder module 8 may employ compression techniques using the field operators. In general, a field operator may be associated with a data field of a message during the encoding and/or decoding process. For example, a message description may specify that a message to includes a data field. Furthermore, the message description may specify that a field operator is associated with the data field. Thus, the message description using field operators may indicate the compression technique applied to each data field.

One example of a field operator is a copy operator. FIG. 1 illustrates the compression technique associated with the copy operator. In various examples throughout this disclosure, the compression technique associated with the copy operator may be referred to as a copy operator compression technique, an equivalence compression technique, or compression technique. In some examples, multiple messages may be generated and encoded using the same message description. Each encoded message may be sent in sequence. Because each message is encoded based on the same message description, the data fields of each message may be the same. Furthermore, some or all of the input values stored in the data fields of each message may be the same as a previously sent message. Redundant data may therefore be present in a data field of a current message when an input value of the current message is equivalent to the input value in a previously sent message. To eliminate this data redundancy, a copy operator may be associated with a data field in the message description. This data field may be referred to as a copy data field.

When a copy operator is associated with a data field, a decoder module may store the previously received input value associated with the copy data field. If a subsequent message, encoded with the same message description as the previous message, is received by the decoder and the presence map value associated with the copy data field is, e.g., '0', the decoder may interpret the corresponding copy data field of the subsequent message as having an input value that is the same as the input value associated with the copy data field of previously received message. In this way, the copy data field of the subsequent message may be left empty by the user, thereby eliminating redundant data, while still communicating the input value of the subsequent message to the decoder module. Thus, if a user sends a value for a field associated with the copy operator and the value is the same as the previous value transmitted for this field, then the new value may not be transmitted and its presence may be turned off in the message presence map.

Although field operators such as the copy operator may be used to reduce data overhead, the burden of using such field operators rested squarely on the user in the past. For example, a user wishing to encode a message using the copy operator was required to learn the associations of each field operator and field contained in the message description. Furthermore, the user was required to remember the previous input value sent in a message. When the user wished to generate a new message in order to take advantage of, e.g., a copy operator, the user had to remember at least the message field, the copy operator associated with the message field, and the previous input value. After the user had gathered the requisite information, the user would determine if the current input value was equivalent to the previously sent input value, and if so, omit the current input value from the generated message. Moreover, the user had to modify the presence map of the message to indicate that the decoder should apply the copy operator upon receiving the encoded message.

As previously described, the overall complexity of encoding a message using field operators limited their use. This was especially true in high-volume messaging environments, e.g., market data providers and financial exchanges. In such environments, it was difficult for a user to remember the vast number of different message descriptions, messages, data fields, and input values that were required to take advantage of the field operators. When confronted with this substantial complexity, users simply resorted to sending redundant data.

Aspects of the present disclosure described hereinafter may enable a user to efficiently generate and send financial messages to an electronic trading system without extensive knowledge of compression techniques described herein. As shown in FIG. 1, application 4 may implement techniques to automatically and seamlessly encode financial data of financial messages using the copy operator with minimal or no user intervention. Consequently, the disclosed techniques may overcome an array of problems that, until now, have limited the use of the copy operator and its associated efficiencies.

As shown in FIG. 1 and previously described herein, encoder module 8 may receive input values from interface 6. The input values may further be encoded in messages 24, 32 by encoder module 8. In some examples of FIG. 1, encoder module 8 may further implement techniques to seamlessly and automatically apply field operators when encoding messages. For example, application 4 may further include an input value cache 10 and field operator cache 12 that may each be accessed by encoder module 8. Input value cache 10 and field operator cache 12 may each be implemented as lookup tables as shown in FIG. 1. Further details of input value cache 10 and field operator cache 12 are described in FIGS. 2 and 4.

In some examples, field operator cache 12 may store associations of data fields and field operators. For example, encoder module 8 may select a data field from a message description and identify a field operator of the message description that is associated with the data field. The data field may be identified by a data field identifier and the field operator may be identified by a field operator identifier. Encoder module 8 may store a data field identifier and field operator identifier as an associated pair in field operator cache 12. In this way, encoder module 8 may, at a later time, access field operator cache 12 to determine if a field operator is associated with a corresponding data field.

In some examples, input value cache 10 may store associations of data fields and input values. For example, user 42 may instruct encoder module 8 to generate a message, e.g., message 24, that includes data fields 28A-28D. Data fields 28A-28D may include input values 30A-30D. Input value cache 10 may store data field identifiers for data fields 28A-28 and corresponding input values 30A-30D. For example, a data field identifier for data field 28A and input value 30A may be stored as an associated pair in input value cache 10. In this way, encoder module 8 may, at a later time, access input value cache 10 to identify the previous input value of a data field in a previously sent message.

In one example use case illustrating techniques of the present disclosure, input value cache 10 and field operator cache 12 may be used to shift the burden of remembering data fields, copy operators, and input values from user 42 to encoder module 8. User 42 may, for example, send multiple FAST-encoded messages to remote server 40 to purchase securities. A message description may specify that a purchasing message includes an ORDER_ID field, TICKER field, PRICE field, and QUANTITY field. Furthermore, the message description may specify that a copy operator is associated with the TICKER field and PRICE field. Consequently, encoder 8 may store associations of copy operators and data field identifiers for each of the TICKER field and PRICE field in field operator cache 12.

To generate a first purchasing message 24 in the current example, user 42 may provide a first group of input values 14 to application 4 via interface 6. Encoder module 8 may receive the first group of input values 14. First group of input values 14 may include one or more input values to be included in first purchasing message 24. First group of input values 14 may further include data that identifies each input value. For example, first group of input values 14 may include data, e.g., "TICKER," which identifies input value 16. This identifying data may be used by encoder module 8 to store the input value in an appropriate data field of a message based on the message description.

Upon receiving first group of input values 14, encoder module 8 may determine from first group of input values 14 that user 42 wishes to generate a purchasing message. Consequently, encoder module 8 may initially select the message description required generate a first purchasing message 24. First purchasing message 24 may include ORDER_ID field 28A, TICKER field 28B, PRICE field 28C, and QUANTITY field 28D.

In the current example, encoder module 8 may query field operator cache 12 to determine if any data fields of first message 24 are associated with field operators. In response to the query, encoder module 8 may identify data fields 28B and 28C are associated with copy operators. Because field operator cache 12 provides encoder module 8 with knowledge of data fields that are associated with copy operators, encoder module 8 may further determine if redundant input values may be removed from message 24. Consequently, encoder module 8 may further query input value cache 10 to determine whether input values from a previously sent purchasing message have been stored in input value cache 10 for each of the TICKER field and the PRICE field. In the current example, no purchasing messages have been generated prior to first purchasing message 24. Thus, the copy operator compression technique is not applicable and the input values for the TICKER field and the PRICE field may be included in message 24.

In some examples, encoder module 8 store input values of a message in input value cache 10 when a message is generated. For example, encoder module 8 may store each input value of group of input values 14 in input value cache 10 with a corresponding data field identifier. In other examples, encoder module 8 may only store input values that correspond to data fields associated with a field operator. In subsequently generated purchasing messages, as will be illustrated below, the previous input values of input value cache 10 may be used by encoder module 8 to eliminate redundant data.

Returning to the current example, encoder module 8 may generate first purchasing message 24 according to techniques previously described herein. Each input value of first group of input values 14 may be included in first purchasing message 24. Encoder module 8 may also include a presence map 26 having values "1111" in first purchasing message 24 to indicate that each data field of message 24 includes an input value 30A-30D. First purchasing message 24 is then sent by encoder module 8 to remote server 40 which may decode message 24 and perform further processing on the input values. For example, as will be discussed below, encoder module 8 may apply various compression techniques to input fields based on field operators associated with the input fields. Field operators may include, for example, a copy operator, increment operator, and delta operator, and are further illustrated below.

In the current example, user 42 may wish to generate a second purchasing message 32. User 42 may subsequently provide a second group of input values 18 to application 4 via interface 6. Encoder module 8 may receive the second group of input values 18 from interface 6 and initially select the message description to generate the second purchasing message 32. Second purchasing message 32 will include the same data fields as first purchasing message 24 because each purchasing message is generated from the same message description for purchasing securities. Thus, second purchasing message 32 may include ORDER_ID field 36A, TICKER field 36B, PRICE field 36C, and QUANTITY field 36D.

Upon receiving second group of input values 18, encoder module 8 may query field operator cache 12 to determine if any data fields of second message 32 are associated with field operators. In response to the query, encoder module 8 may determine that TICKER field 36B and PRICE field 36C are associated with copy operators. Because field operator cache 12 provides encoder module 8 with knowledge of data fields that are associated with copy operators, encoder module 8 may further determine if redundant input values may be omitted from second purchasing message 32. Consequently, encoder module 8 may query input value cache 10 to determine whether input values from a previously sent purchasing message, e.g., first purchasing message 24, have been stored in input value cache 10 for each of the TICKER field and the PRICE field.

In the current example, first purchasing message 24 was generated prior to second purchasing message 32. Moreover, input values of first purchasing message 24 have been stored in input value cache 10. Thus, the copy operator compression technique may be applied to TICKER field and the PRICE field. To perform the copy operator compression technique, encoder module 8 may select input values associated with the TICKER field and the PRICE field that were stored in input value cache 10 during generation of first purchasing message 24. As shown in FIG. 1, input value 16 ("QFT") of was stored in input value cache 10 when first purchasing message 24 was generated by encoder module 8. Encoder module 8, now encoding second purchasing message 32, may select input value 20, i.e., "QFT," and compare it to the previous input value of the TICKER field stored in input value cache 10. Because the previous input value of the TICKER field and input value 20 are equivalent, input value 20 may be omitted from TICKER data field 36B. Thus, the copy operator compression technique enables encoder module 8 to omit the input value "QFT" because it is redundant data.

In the current example, encoder module 8 may also set the presence map value corresponding to TICKER field 36B to '0.' Setting the presence map value to '0' for TICKER field 36B indicates to a decoding module, e.g., executing on remote server 40, that the input value of TICKER field 36B is actually a copy of the input value sent in the previous purchasing message, i.e., first purchasing message 24. In this way, input value 20 may be communicated to remote server 40 while omitting input value 20 from second purchasing message 32. Consequently, the copy operator technique applied by encoder module 8 eliminates redundant data from second message 32 while communicating the appropriate input values to remote server 40. As illustrated in the example of FIG. 1, similar compression techniques associated with the copy operator may be applied to PRICE field 36C.

As can be seen from the current example, the encoding techniques described herein may substantially reduce the amount of information that user 42 must remember when using a field operator. For example, input value cache 10 eliminates the need for user 42 to remember the previous input value associated with each data field. Similarly, field operator cache 12 eliminates the need for user 42 to recall the message description and remember the associations between data fields and field operators. Thus, the aforementioned techniques implemented by encoder module 8 automatically encode input values in a message using input value cache 10 and field operator cache 12. In addition to eliminating the need to remember large amounts of information, the techniques implemented by encoder module 8 eliminate burdens on user 42 such as setting presence map values, omitting input values from data fields, storing previously sent input values, and comparing input values. Instead, in some examples, user 42 simply enters a group of input values and encoder module 8 automatically applies the compression techniques associated with various field operators and associated fields. As a result, the aforementioned techniques may substantially reduce redundant data in message and increase user productivity by shifting the burden of applying the compression techniques from user 42 to encoder module 8. Moreover, because the aforementioned techniques may be performed by computing device 2 rather than user 42, the encoding process may be performed more quickly.

As can be seen in the current example, aspects of the present disclosure may provide a user friendly application programming interface (API) to encode input values using the copy operator. Techniques of the present disclosure may thus allow a user to set the intended input value via the API and the encoder may automatically apply the copy operator compression technique. Moreover, the encoder, when applying the copy operator compression technique may perform, as described above, a pre-encoding check to identify duplicate field values for the copy operator and accordingly set values in the presence map of a message. This pro-active detection and setting of the presence map may preclude the transmission of redundant financial data.

Figure 2:
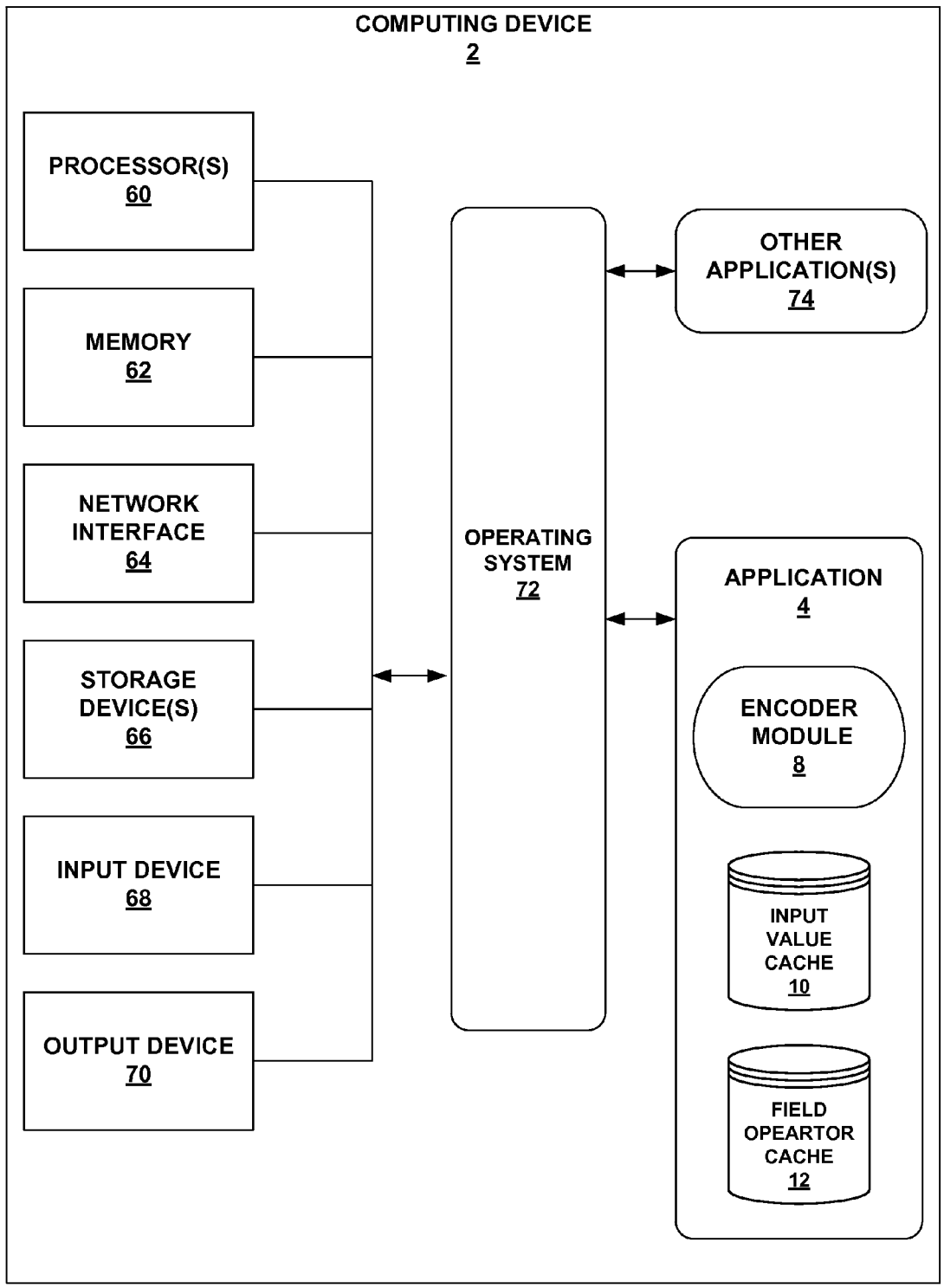
FIG. 2 is a block diagram illustrating further details of one example of computing device as shown in FIG. 1, in accordance with one or more aspects of the present disclosure.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 60, memory 62, a network interface 64, one or more storage devices 66, input device 68, and output device 70. Computing device 2 also includes an operating system 72. Computing device 2, in one example, further includes application 6 and one or more other applications 74. Application 6 and one or more other applications 74 are also executable by computing device 2. Each of components 60, 62, 64, 66, 68, 70, 72, 74, and 6 may be interconnected (physically, communicatively, and/or operatively) for inter-component communications.

Processors 60, in one example, are configured to implement functionality and/or process instructions for execution within computing device 2. For example, processors 60 may be capable of processing instructions stored in memory 62 or instructions stored on storage devices 66.

Memory 62, in one example, is configured to store information within computing device 2 during operation. Memory 62, in some examples, is described as a computer-readable storage medium. In some examples, memory 62 is a temporary memory, meaning that a primary purpose of memory 62 is not long-term storage. Memory 62, in some examples, is described as a volatile memory, meaning that memory 62 does not maintain stored contents when the computer is turned off. Examples of volatile memories include random access memories (RAM), dynamic random access memories (DRAM), static random access memories (SRAM), and other forms of volatile memories known in the art. In some examples, memory 62 is used to store program instructions for execution by processors 60. Memory 62, in one example, is used by software or applications running on computing device 2 (e.g., application 8 and/or one or more other applications 74) to temporarily store information during program execution.

Storage devices 66, in some examples, also include one or more computer-readable storage media. Storage devices 66 may be configured to store larger amounts of information than memory 62. Storage devices 66 may further be configured for long-term storage of information. In some examples, storage devices 66 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 64. Computing device 2, in one example, utilizes network interface 64 to communicate with external devices via one or more networks, such as one or more wireless networks. Network interface 64 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 utilizes network interface 64 to wirelessly communicate with an external device (not shown) such as a server, mobile phone, or other networked computing device.

Computing device 2, in one example, also includes one or more input devices 68. Input device 68, in some examples, is configured to receive input from a user through tactile, audio, or video feedback. Examples of input device 68 include a presence-sensitive screen, a mouse, a keyboard, a voice responsive system, video camera, microphone or any other type of device for detecting a command from a user.

One or more output devices 70 may also be included in computing device 2. Output device 70, in some examples, is configured to provide output to a user using tactile, audio, or video stimuli. Output device 70, in one example, includes a presence-sensitive screen, sound card, a video graphics adapter card, or any other type of device for converting a signal into an appropriate form understandable to humans or machines. Additional examples of output device 70 include a speaker, a cathode ray tube (CRT) monitor, a liquid crystal display (LCD), or any other type of device that can generate intelligible output to a user.

Computing device 2 may include operating system 72. Operating system 72, in some examples, controls the operation of components of computing device 2. For example, operating system 72, in one example, facilitates the interaction of application 6 with processors 60, memory 62, network interface 64, storage device 66, input device 68, AND output device 70. Examples of operating system 72 may include Linux®, Microsoft® Windows®, Mac OS®, i5/OS®, AIX®, and z/OS®.

As shown in FIG. 2, application 6 may include encoder module 8. Encoder module 8 may each include program instructions and/or data that are executable by computing device 2. For example, encoder module 8 may include instructions that cause application 6 executing on computing device 2 to perform the operations and actions described in FIG. 1-10.

Computing device 2 may, for example, include or connect to input value cache 10 and/or field operator cache 12. For example, input value cache 10 and/or field operator cache 12 may be implemented in application 6 as program instructions and/or data. In other examples, input value cache 10 and/or field operator cache 12 may be implemented as program instructions and/or data in other applications 74 or on one or more separate computing devices. In such examples, application 6 may communicate with input value cache 10 and/or field operator cache 12 via interprocess communication, network communication or other communication techniques that facilitate the transmission of information.

In some examples, input value cache 10 and/or field operator cache 12 may be implemented as a lookup table. Other suitable data structures to implement input value cache 10 and/or field operator cache 12 may include maps and arrays. In some examples, input value cache 10 and/or field operator cache 12 may be implemented as databases. Data from input value cache 10 and/or field operator cache 12 may be made accessible by Relational Database Management System (RDBMS) software. For example, input value cache 10 and/or field operator cache 12 may be a relational database and accessed using a Structured Query Language (SQL) interface that is well known in the art. Input value cache 10 and/or field operator cache 12 may in other examples be an Object Database Management System (ODBMS), Online Analytical Processing (OLAP) database or other suitable data management system, Any applications, e.g., application 6 or other applications 74, implemented within or executed by computing device 2 may be implemented or contained within, operable by, executed by, and/or be operatively/communicatively coupled to components of computing device 2, e.g., processors 60, memory 62, network interface 64, and/or storage devices 66.

Figure 3:
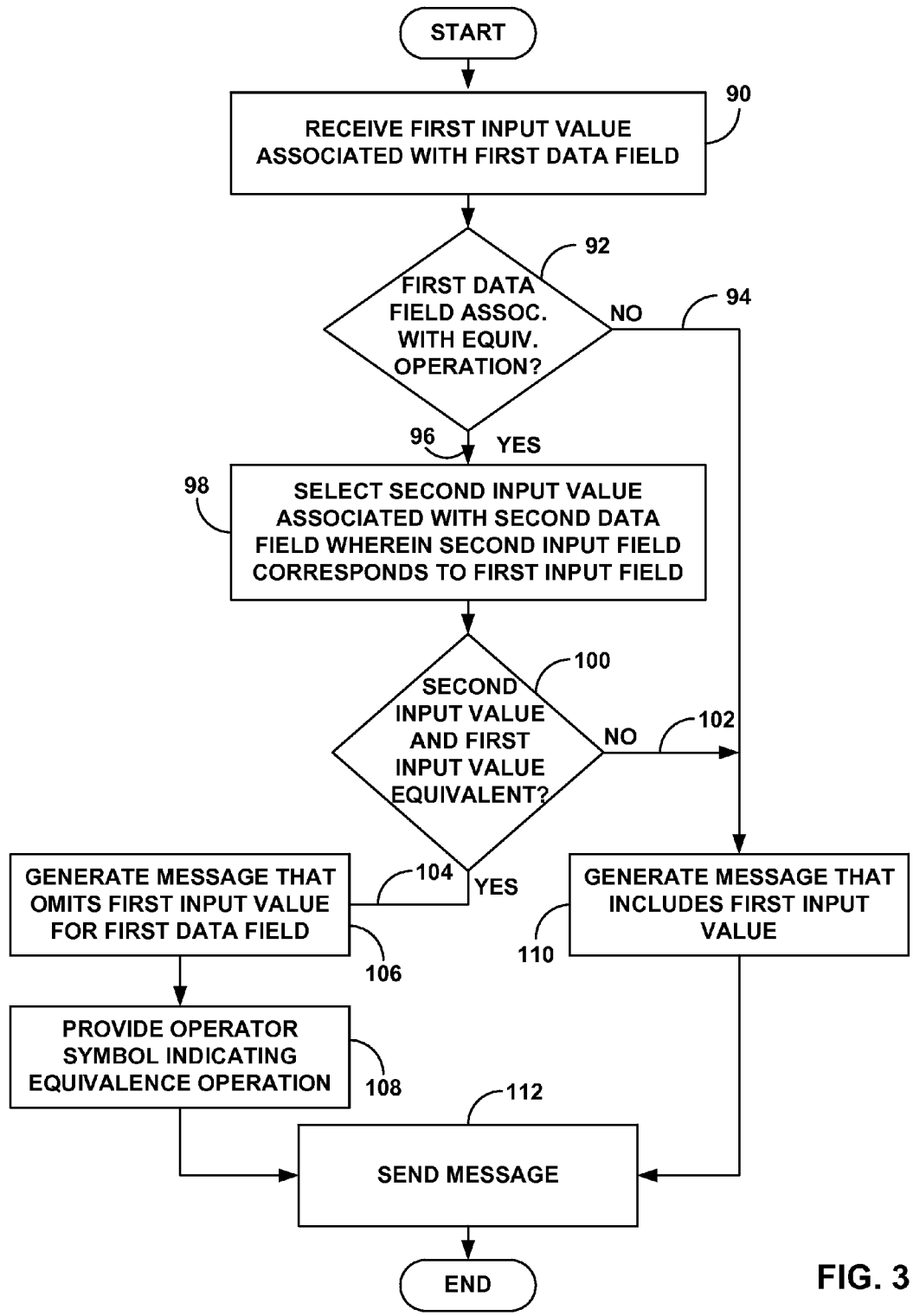
FIG. 3 is a flow diagram illustrating an example method that may be performed by a computing device to encode a message using a copy operator, in accordance with one or more aspects of the present disclosure.

FIG. 3 is a flow diagram illustrating an example method that may be performed by a computing device to encode a message using a copy operator, in accordance with one or more aspects of the present disclosure. For example, the method illustrated in FIG. 3 may be performed by computing device 2 shown in FIGS. 1 and/or 2.

As shown in FIG. 3, the method includes receiving a first input value associated with a first data field. An encoding module may receive the input value via the GUI (90). The input value may be associated with a first data field of a message. The encoding module may then determine whether the first data field is associated with an equivalence operator, e.g., a copy operator (92). For example, the encoder module may query a field operator cache as described in FIG. 1 to identify whether the first data field is associated with the equivalence operator. If the encoder module determines the data field is not associated with a copy operator (94), the encoder module may proceed to generate a message that includes the first input value (110). If, however, the data field is associated with a copy operator the encoder will proceed to automatically apply the copy operator compression technique (96).

As shown in FIG. 3, the method may continue to element 98 wherein the encoder module selects a second input value associated with a second data field and the second data field corresponds to the first input field. In one example, the second input value may correspond to the input value stored in an input value cache as described in FIG. 1. Furthermore, the second data field may refer to a data field of a previously sent message. The first data field of the current message may correspond to the second data field such that the first data field of the current message is the same as the second data field of the previously sent message. As described in FIG. 1, the encoder module may select the second input value from the input value cache based on a data field identifier.

Upon selecting the second input value, the encoder module may compare the second input value, e.g., the previously sent input value, and the first input value, e.g., the current input value to determine if the input values are equivalent (100). If the input values are not equivalent (102), the encoder module may proceed to generate a message that includes the first input value (110). In some examples, if the input values are not equivalent, the encoder module may store the first input value in an input value cache. If, however, the second input value and the first input value are equivalent (104), the encoder module may generate a message that omits the first input value for first data field (106). Omitting a first input value may include providing an empty field in the message.

As shown in FIG. 3, upon generating a message that omits the first input value for the first data field (106), the encoder module may proceed to provide an operator symbol indicating an equivalence operation (108). In one example, providing operator symbol that indicates an equivalence operation may include setting a value of a presence map to a value that indicates the copy operator. In some example, the value of the presence map may be set to '0' to indicate the decoding module should associate the previously sent input value with the first data field. In some examples, the message may be sent by the encoding module to a remote server that includes a decoder module (112).

Figure 4:
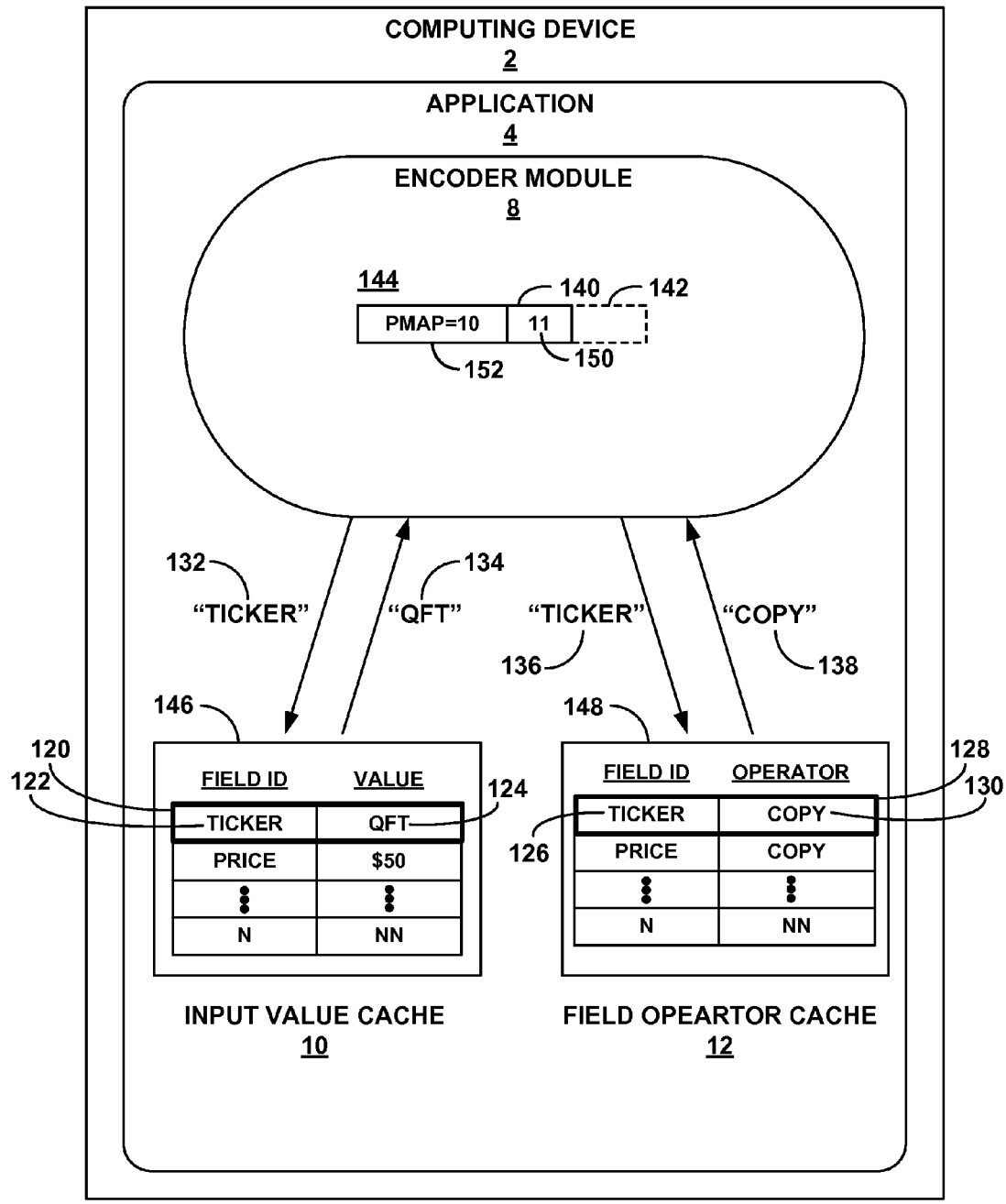
FIG. 4 is a block diagram further illustrating an example encoder module that accesses an input value cache and field operator cache, in accordance with one or more aspects of the present disclosure.

FIG. 4 is a block diagram further illustrating an encoder module that accesses an input value cache and field operator cache, in accordance with one or more aspects of the present disclosure. Computing device 2, application 4, encoder module 8, input value cache 10, and field operator cache 12, as shown in FIG. 4, include similar features and characteristics as shown in FIGS. 1 and 2 unless further described hereinafter. FIG. 4 illustrates, in further detail, encoder module 8 generating a message and example structures of input value cache 10 and field operator cache 12.

As shown in FIG. 4, input value cache 10 may be implemented as a lookup table 146. Lookup table 146 may further include one or more Data Field Identifier/Input Value pairs 120. Each pair may include a data field identifier that identifies a data field of a message description. Data field identifier 122 may further correspond to a data field of a message encoded based on the message description. As shown in FIG. 4, data field identifier 122 includes the value "TICKER." Data field identifier 122 may correspond, for example, to a message field that stores a security identifier. Pair 120 further includes an input value 124. Input value 124 may correspond to an input value of a previously-encoded message. For example, if input value 124 ("QFR") was previously encoded in a "TICKER" data field of a message, an encoder module may store input value 124 in input value cache 10 with data field identifier 122. In this way, encoder module 8 may later retrieve previously encoded input values when encoding a subsequent message using, e.g., a copy operator compression technique.

FIG. 4 further illustrates a field operator cache. As shown in FIG. 4, field operator cache 2 is implemented as a lookup table 148. Lookup table 148 may further include one or more Data Field Identifier/Field Operator Identifier pairs 128. Each pair may include a data field identifier. The data field identifier may further correspond to a data field of a message encoded based on the message description. As shown in FIG. 4, data field identifier 126 includes the value "TICKER." Data field identifier 126 may correspond, for example, to a message field that stores a security identifier. Pair 128 further includes an operator identifier 130. An operator identifier may identify a field operator associated with data field identified by data field identifier 126. For example, if a copy operator is associated with a "TICKER" data field of a message description, operator identifier 130 may include the value "COPY" to indicate the copy operator. Other examples of operator identifier values may include "INCREMENT," "DELTA," "CONSTANT" or "SKIP." In this way, encoder module 8 may later retrieve the field operator associated with a particular data field of a message.

FIG. 4 illustrates an encoder module 8 that may generate a message 144 using input value cache 10 and field operator cache 12. For example, encoder module 8 may initially receive two input values from an interface (not shown). An order input value may include the value "11," which may correspond to an ORDER_ID field of a message. A ticker input value may include the value "QFT," which may correspond to a ticker symbol of a security. To encode message 144 that includes the order input value and the ticker input value, encoder module 8 may apply techniques of the present disclosure as described in FIGS. 1-3. Encoder module 8 may initially query field operator cache 12 to determine if a field operator is associated with the ORDER_ID field of message 144. Because no data field identifier for the ORDER_ID field exists in field operator cache 12, encoder module 8 may store the value "11," in field 140 of message 144. Field 140 of message 144 may correspond to the ORDER_ID field of the message description. Thus, encoder module 8 may store order input value "11" in data field 140. In addition, encoder module 8 may update presence map to indicate that the ORDER_ID field of message 144 includes order input value 150 ("11").

As shown in FIG. 4, encoder module 8 may query field operator cache 12 to determine if a field operator is associated with TICKER field 142 of message 144. For example, encoder module 8 may use data 136 to query field operator cache 12. Because data field identifier 126 for TICKER field 142 exists in field operator cache 12, encoder module 8 may identify field operator identifier 130 of pair 128. Consequently, encoder module 8 may use data 138 that indicates the copy operator to apply the copy operator compression technique.

To apply the copy operator compression technique, encoder module 8 may query input value cache 10 to identify a previously encoded input value associated with TICKER field 142. For example, encoder module 8 may query input value cache 10 using data 132, which identifies TICKER field 142 of message 144. Using data 132, encoder module 8 may determine that input value cache 10 includes data field identifier 122. Furthermore, encoder module 8 may determine, based on data field identifier 122, that input value 124 is associated with data field identifier 122. Input value 124 may have been stored in input value cache 10 by encoder module 8 when a previous message was generated that included input value 124. Applying the copy operator compression technique, encoder module 8 may determine that input value 124 is equivalent to the current input value, and therefore, encoder module 8 may omit the input value 134 from data field 142.

Field 140 of message 144 may correspond to the ORDER_ID field of the message description. Thus, encoder module 8 may store order input value "11" in data field 140. In addition, encoder module 8 may update presence map 150 to indicate that the ORDER_ID field of message 144 includes order input value 150 ("11"). Thus, presence map 150 may include the value '10' such that the value '1' indicates field 140 includes a an input value 150 and the value '0' indicates field 142 is associated with a copy operator.

Figure 5:
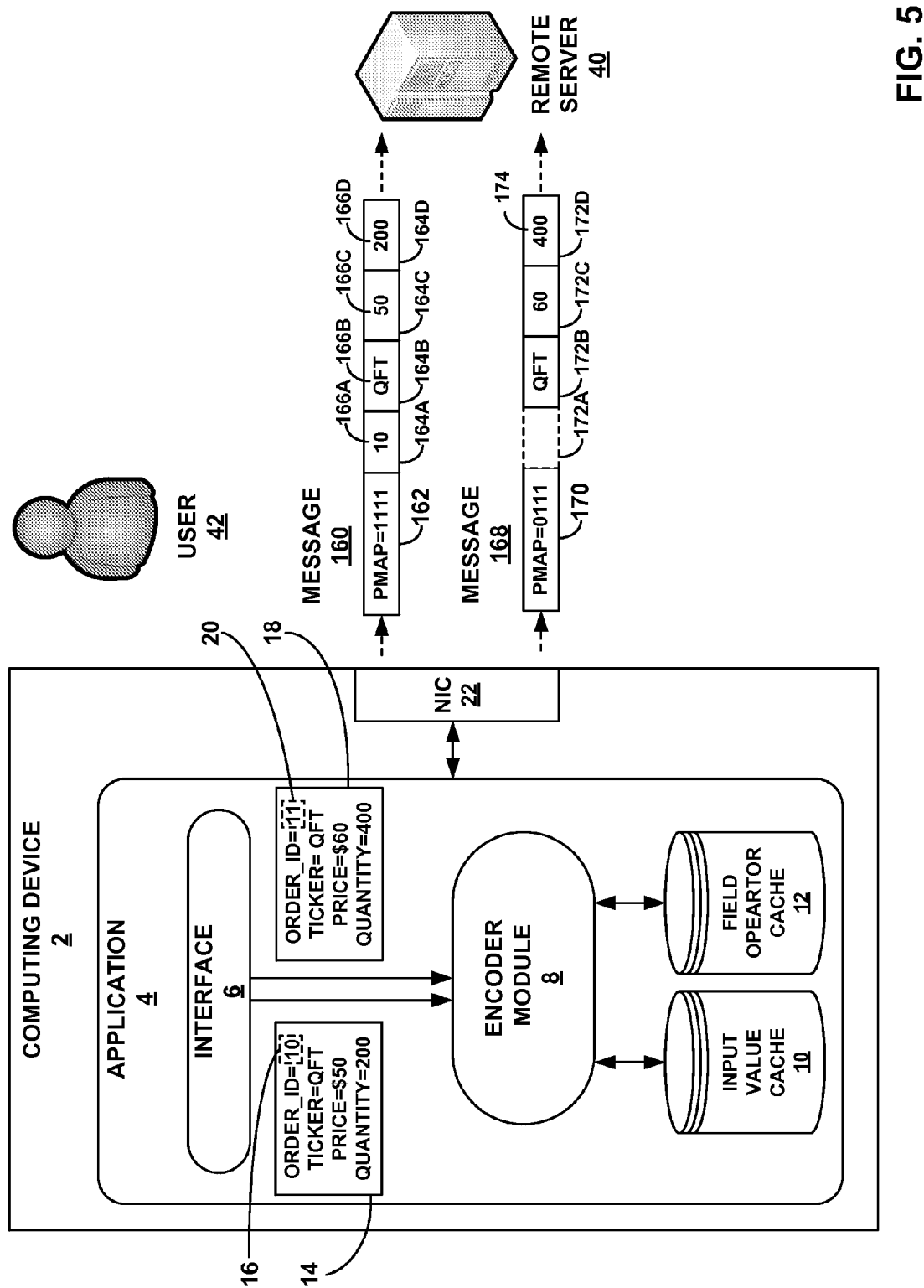
FIG. 5 is a block diagram illustrating an example computing device that may implement an increment encoding technique, in accordance with one or more aspects of the present disclosure.

FIG. 5 is a block diagram illustrating a computing device 2 that may implement an increment encoding technique described hereinafter, in accordance with one or more aspects of the present disclosure. Computing device 2, application 4, encoder module 8, input value cache 10, and field operator cache 12, as shown in FIG. 4, include similar features and characteristics as shown in FIGS. 1 and 2 unless further described hereinafter.

As previously described herein, the FAST protocol provides various field operators. In addition to the copy operator as shown in FIGS. 1-4, the FAST protocol includes an increment operator. FIG. 5 illustrates the compression technique associated with the increment operator. In various examples throughout this disclosure, the compression technique associated with the increment operator may be referred to as an increment operator compression technique, increment compression technique, or compression technique. As previously described in the examples of FIGS. 1-4, multiple messages may often be generated and encoded using the same message description. Each encoded messages may be sent in sequence. Because each message is encoded based on the same message description, the data fields of each message may be the same. Furthermore, in some examples, one input value may be the sum of an increment in the previous value. For example, a first message may include a data field that stores an input value of 8. A second message sent in sequence may include the same data field but stores an input value of 9. Because the second input value (9) is the sum of the previous input value (8) and an increment (1), an increment operator may be applied to eliminate redundant data. Redundant data may present in a data field of a current message when an input value of the current message is a sum of an increment value and the input value of the same data field in a previously sent message. To eliminate this data redundancy, the increment operator may be associated with a data field in the message description. This data field may be referred to as an increment data field.

When an increment operator is associated with a data field, a decoder module may store the previously received input value associated with the increment data field. If a subsequent message, encoded with the same message description as the previous message, is received by the decoder and the presence map value associated with the increment data field is '0', the decoder will interpret the increment data field of the subsequent message as having an input value that is the sum of an increment value and the input value associated with the increment data field of previously received message. In this way, the increment data field of the subsequent message may be left empty by the user, thereby eliminating redundant data, while still communicating the input value of the subsequent message to the decoder module.

Aspects of the present disclosure described hereinafter enable a user to efficiently generate and send financial messages to an electronic trading system without extensive knowledge of compression techniques described herein. As shown in FIG. 5, application 4 may implement techniques to automatically and seamlessly encode financial data of financial messages using the increment operator compression technique with minimal or no user intervention. Consequently, the disclosed techniques overcome an array of problems that, until now, have limited the use of the increment operator and associated efficiencies.

As shown in FIG. 5, encoder module 8 may receive input values from interface 6. The input values may further be encoded in messages 160, 168 by encoder module 8. In some examples of FIG. 5, encoder module 8 may further implement techniques to seamlessly and automatically apply an increment operator when encoding messages. For example, application 4 may further include an input value cache 10 and field operator cache 12 that may each be accessed by encoder module 8. Input value cache 10 and field operator cache 12 may each be implemented as lookup tables as shown in FIG. 1.

In one example use case illustrating techniques of the present disclosure, input value cache 10 and field operator cache 12 may be used to shift the burden of remembering data fields, increment operators, and input values from user 42 to encoder module 8. User 42 may, for example, send multiple FAST-encoded messages to remote server 40 to purchase securities. A message description may specify that a purchasing message includes an ORDER_ID field, TICKER field, PRICE field, and QUANTITY field. In the current example, the message description may specify an increment operator is associated with the ORDER_ID field. Consequently, encoder 8 may store an association of an increment operator and a data field identifier for the ORDER_ID field in field operator cache 12.

In the current example, user 42 may provide a first group of input values 14 to application 4 via interface 6 to generate a first purchasing message 160. Encoder module 8 may receive the first group of input values 14. First group of input values 14 may include one or more input values to be included in first purchasing message 24. First group of input values 14 may further include data that identifies each input value. For example, first group of input values 14 may include data, e.g., "ORDER_ID", that identifies input value 16. This identifying data may be used by encoder module 8 to store the input value in an appropriate data field of a message based on the message description.

Upon receiving first group of input values 14, encoder module 8 may determine from first group of input values 14 that user 42 wishes to generate a purchasing message. Consequently, encoder module 8 may initially select the message description required generate a first purchasing message 162. First purchasing message 162 may include ORDER_ID field 164A, TICKER field 164B, PRICE field 164C, and QUANTITY field 164D that include input values 166A-166D, respectively.

In the current example, encoder module 8 may query field operator cache 12 to determine if any data fields of first message 24 are associated with field operators. In response to the query, encoder module 8 may identify data field 164A is associated with an increment operator. Because field operator cache 12 provides encoder module 8 with knowledge of data fields that are associated with the increment operator, encoder module 8 may further determine if redundant input values may be removed from message 160. Consequently, encoder module 8 may further query input value cache 10 to determine whether input values from a previously sent purchasing message have been stored in input value cache 10 for each of the ORDER_ID field, TICKER field, and PRICE field. In the current example, no purchasing messages have been generated prior to first purchasing message 24. Thus, the increment operator compression technique may not be applicable when encoding message 160. Consequently, the input values for the ORDER_ID field, TICKER field, PRICE field, and QUANTITY field may be included in message 160. In addition, encoder module 8 may set the values of the presence map for data fields 164A-164D to '1' because each data field stores an input value in message 160.

In the current, example, user 42 may wish to generate a second purchasing message 168. User 42 may subsequently provide a second group of input values 18 to application 4 via interface 6. Encoder module 8 may receive the second group of input values 18 from interface 6 and initially select the message description to generate the second purchasing message 168. Second purchasing message 168 will include the same data fields as first purchasing message 160 because each purchasing message is generated from the same message description for purchasing securities. Thus, second purchasing message 168 may include ORDER_ID field 172A, TICKER field 172B, PRICE field 172C, and QUANTITY field 172D.

Upon receiving second group of input values 18, encoder module 8 may query field operator cache 12 to determine if any data fields of first message 24 are associated with field operators. In response to the query, encoder module 8 may identify that ORDER_ID field 172A is associated with an increment operator. Because field operator cache 12 provides encoder module 8 with knowledge of data fields that are associated with the increment operator, encoder module 8 may further determine if redundant input values may be omitted from second purchasing message 168. Consequently, encoder module 8 may query input value cache 10 to determine whether input values from a previously sent purchasing message, e.g., first purchasing message 160, have been stored in input value cache 10 for the ORDER_ID field.

In the current example, first purchasing message 160 has been generated prior to second purchasing message 168. Moreover, the input values of first purchasing message 160 have been stored in input value cache 10. Thus, the increment operator compression technique may be applied to the ORDER_ID field. To perform the increment operator compression technique, encoder module 8 may select the input value associated with the ORDER_ID field that were stored in input value cache 10 during generation of first purchasing message 160. As shown in FIG. 1, input value 16 ("10") of was stored in input value cache 10 when first purchasing message 160 was generated by encoder module 8. Encoder module 8, now encoding second purchasing message 168, may select input value 20, i.e., "11," and compare it to the previous input value of the ORDER_ID field stored in input value cache 10. Because input value 20 is the sum of an increment value ("1") and the previous input value of the ORDER_ID field ("10"), input value 20 may be omitted from ORDER_ID data field 172A. Thus, the increment operator compression technique enables encoder module 8 to omit the input value "11" because it is redundant data.

In the current example, encoder module 8 may also set the presence map value of presence map 170 corresponding to ORDER_ID field 172A to '0.' Setting the presence map value to '0' for ORDER_ID field 172A indicates to a decoding module, e.g., executing on remote server 40, that the input value of ORDER_ID field 172A is actually the sum of an increment value and the input value sent in the previous purchasing message, i.e., first purchasing message 160. In this way, input value 20 may be communicated to remote server 40 while omitting input value 20 from second purchasing message 168. Consequently, the increment operator technique applied by encoder module 8 eliminates redundant data from second message 168 while still communicating the appropriate input values to remote server 40.

As shown in FIG. 5, an increment value may, in some examples, be an integer. In other examples, an increment value may be a floating point value. In still other examples, an increment value may be any value that may be added to an input value. In some cases, the increment value is specified in the message description. For example, the increment value may be associated with the data field in the message description. Thus, a message description in some examples may indicate an increment operator and an increment value are associated with a data field.

As can be seen in the current example, aspects of the present disclosure may provide a user friendly application programming interface (API) to encode input values using the increment operator. Techniques of the present disclosure may thus allow a user to set the intended input value via the API and the encoder may automatically apply the increment operator compression technique. Moreover, the encoder, when applying the increment operator compression technique may perform, as described above, a pre-encoding check to identify duplicate data for the increment operator and accordingly set values in the presence map of a message. This pro-active detection and setting of the presence map may preclude the transmission of redundant financial data.

Figure 6:
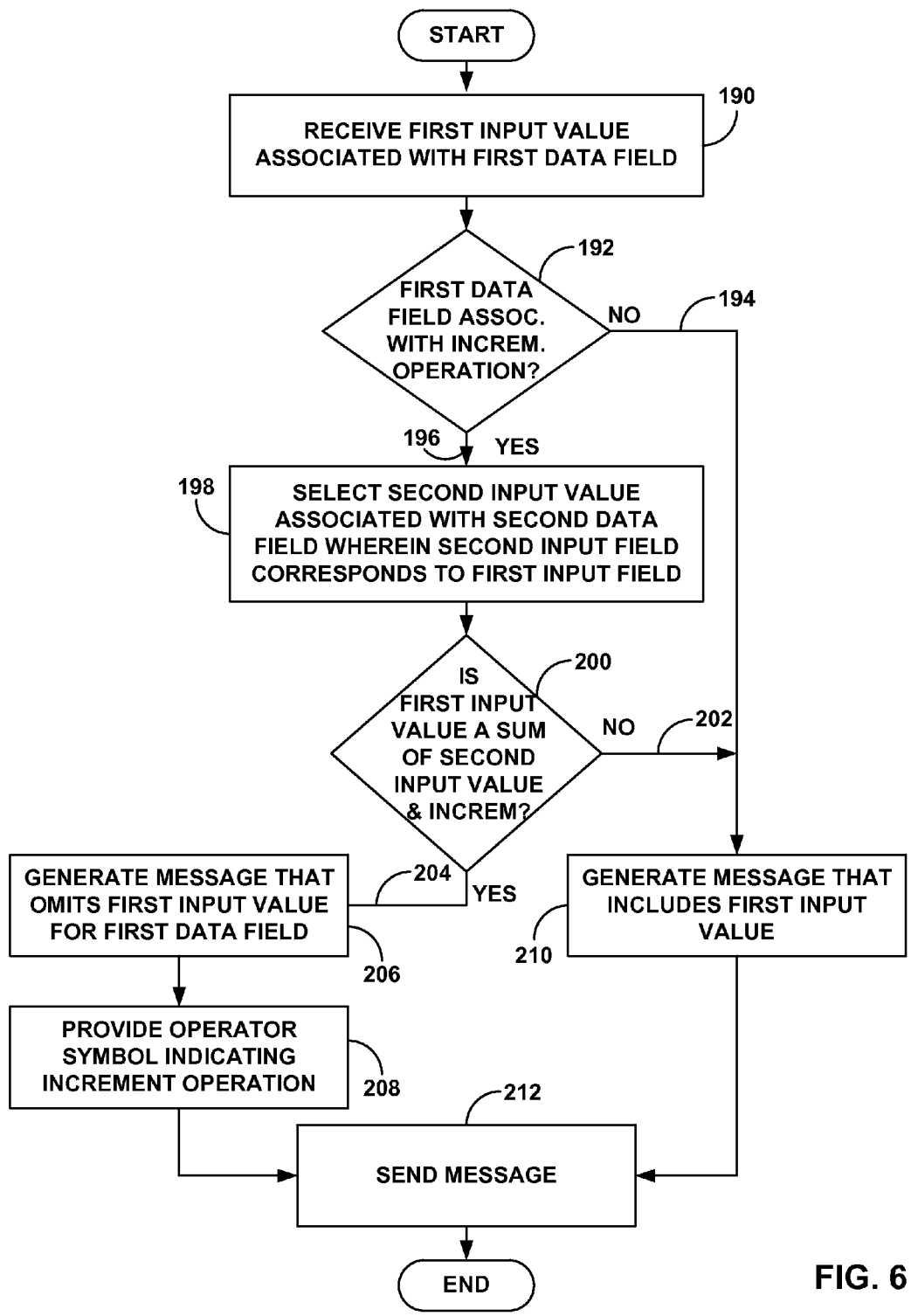
FIG. 6 is a flow diagram illustrating an example method that may be performed by a computing device to encode a message using an increment operator, in accordance with one or more aspects of the present disclosure.

FIG. 6 is a flow diagram illustrating an example method that may be performed by a computing device to encode a message using an increment operator, in accordance with one or more aspects of the present disclosure. For example, the method illustrated in FIG. 6 may be performed by computing device 2 shown in FIGS. 2 and/or 5.

As shown in FIG. 6, the method includes receiving a first input value associated with a first data field. For example, a user may provide an input value via a GUI of a trading application. An encoding module may receive the input value via the GUI (190). The input value may be associated with a first data field of a message. The encoding module may then determine whether the first data field is associated with an increment operator (192). For example, the encoder module may query a field operator cache as described in FIG. 1 to identify whether the first data field is associated with the increment operator. If the encoder module determines the data field is not associated with a increment operator (194), the encoder module may proceed to generate a message that includes the first input value (210). If, however, the data field is associated with an increment operator the encoder will proceed to automatically apply the increment operator compression technique (196).

As shown in FIG. 6, the encoder module selects a second input value associated with a second data field and the second data field corresponds to the first input field (198). In one example, the second input value may correspond to the input value stored in an input value cache as described in FIGS. 1 and 5. Furthermore, the second data field may refer to a data field of a previously sent message. The first data field of the current message may correspond to the second data field such that the first data field of the current message is the same as the second data field of the previously sent message. As described in FIGS. 1 and 5, the encoder module may select the second input value from the input value cache based on a data field identifier.

Upon selecting the second input value, encoder module may compare the second input value, e.g., the previously sent input value, and the first input value, e.g., the current input value to determine if the first input value is a sum of an increment value and the second input value (200). If the input values are not equivalent (202), the encoder module may proceed to generate a message that includes the first input value (210). In some examples, if the input values are not equivalent, the encoder module may store the first input value in an input value cache. If, however, the second input value and the first input value are equivalent (204), the encoder module may generate a message that omits the first input value for first data field (206). Omitting a first input value may include providing an empty field in the message.

As shown in FIG. 6, upon generating a message that omits the first input value for the first data field (206), the encoder module may proceed to provide an operator symbol indicating an increment operation (208). In one example, providing operator symbol that indicates an equivalence operation may include setting a value of a presence map to a value that indicates the increment operator. In some example, the value of the presence map may be set to '0' to indicate the decoding module should associate a sum of an increment and the previously sent input value with the first data field. In some examples, the message may be sent by the encoding module to a remote server that includes a decoder module (212).

Figure 7:
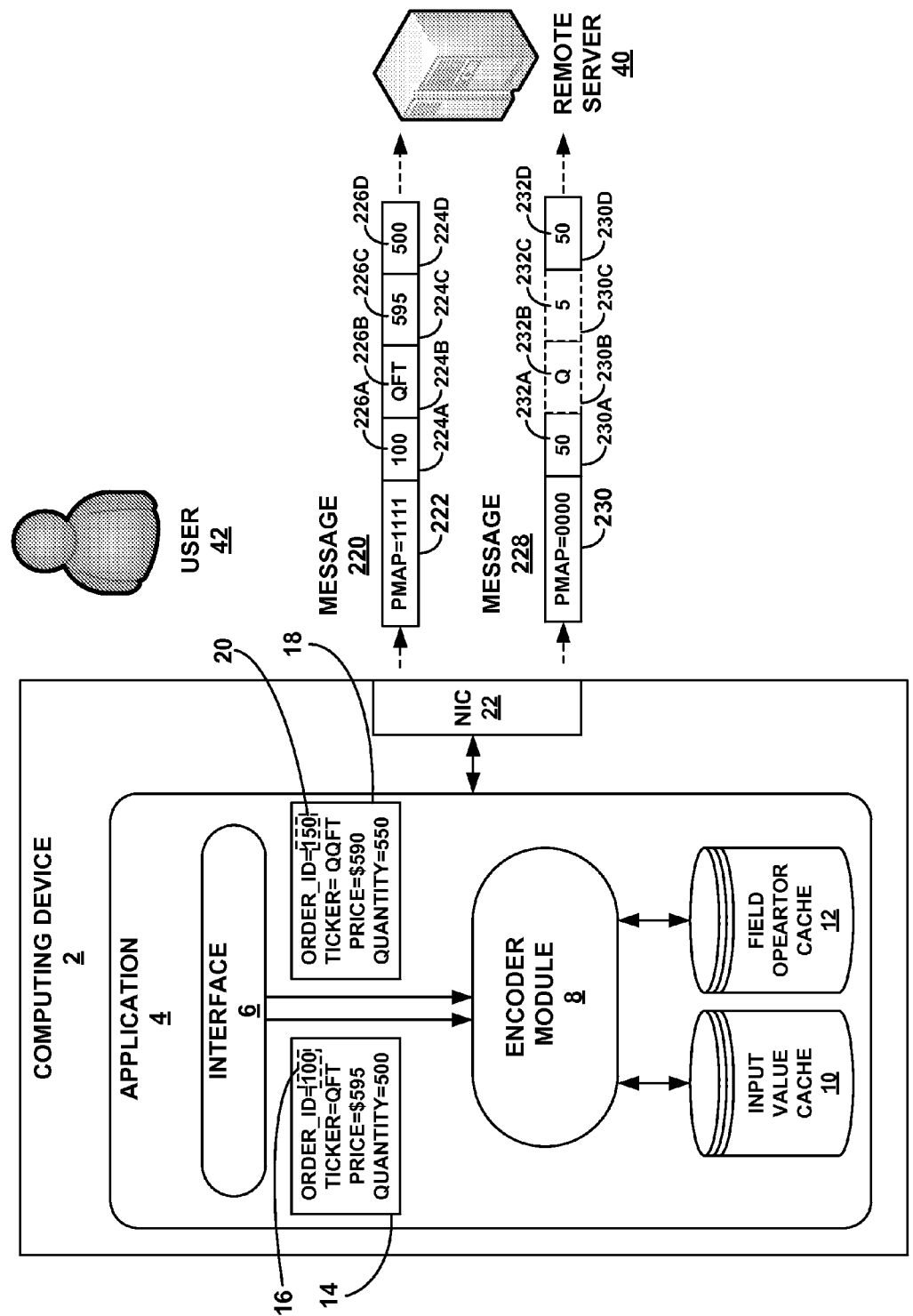
FIG. 7 is a block diagram illustrating an example computing device that may implement a delta encoding technique described hereinafter, in accordance with one or more aspects of the present disclosure.

FIG. 7 is a block diagram illustrating a computing device 2 that may implement a delta encoding technique described hereinafter, in accordance with one or more aspects of the present disclosure. Computing device 2, application 4, encoder module 8, input value cache 10, and field operator cache 12, as shown in FIG. 7, include similar features and characteristics as shown in FIGS. 1 and 2 unless further described hereinafter.

As previously described herein, the FAST protocol includes various field operators. In addition to the copy operator and increment operator as shown in FIGS. 1-6, the FAST protocol includes a delta operator. FIG. 7 illustrates the compression technique associated with the delta operator. In various examples throughout this disclosure, the compression technique associated with the delta operator may be referred to as a delta operator compression technique, delta compression technique, or compression technique. As previously described in the examples of FIGS. 1-4, multiple messages may often be generated and encoded using the same message description. Each encoded messages may be sent in sequence. Because each message is encoded based on the same message description, the data fields of each message may be the same. Furthermore, in some examples, one input value may share some but not all of the same data as the previous value. For example, a first message may include a data field that stores an input value of "QFT." A second message sent in sequence may include the same data field but store an input value of "QQFT." Because the second input value ("QQFT") shares some but not all of the same data as the previous input value ("QFT"), a delta operator may be applied to eliminate redundant data. Redundant data may present in a data field of a current message when an input value of the current message includes some of the same data included in a previously sent message. To eliminate this data redundancy, the delta operator may be associated with a data field in the message description. This data field may be referred to as a delta data field.

When a delta operator is associated with a data field, a decoder module may store the previously received input value associated with the delta data field. If a subsequent message, encoded with the same message description as the previous message, is received by the decoder and the presence map value associated with the delta data field is, e.g., '0', the decoder will interpret the delta data field of the subsequent message as having data that includes the difference between the previous input value and the subsequent input value. In this way, the delta data field of the subsequent message may include differences between the previous input value and the subsequent input value, thereby eliminating redundant data, while still communicating the input value of the subsequent message to the decoder module.

Aspects of the present disclosure described hereinafter enable a user to efficiently generate and send financial messages to an electronic trading system without extensive knowledge of compression techniques described herein. As shown in FIG. 7, application 4 may implement techniques to automatically and seamlessly encode financial data of financial messages using the delta operator compression technique with minimal or no user intervention. Consequently, the disclosed techniques overcome an array of problems that, until now, have limited the use of the increment operator and associated efficiencies.

As shown in FIG. 7, encoder module 8 may receive input values from interface 6. The input values may further be encoded in messages 220, 228 by encoder module 8. In some examples of FIG. 7, encoder module 8 may further implement techniques to seamlessly and automatically apply a delta operator when encoding messages. For example, application 4 may further include an input value cache 10 and field operator cache 12 that may each be accessed by encoder module 8. Input value cache 10 and field operator cache 12 may each be implemented as lookup tables as shown in FIG. 1.

In one example use case illustrating techniques of the present disclosure, input value cache 10 and field operator cache 12 may be used to shift the burden of remembering data fields, delta operators, and input values from user 42 to encoder module 8. User 42 may, for example, send multiple FAST-encoded messages to remote server 40 to purchase securities. A message description may specify that a purchasing message includes an ORDER_ID field, TICKER field, PRICE field, and QUANTITY field. In the current example, the message description may specify a delta operator is associated with each data field. Consequently, encoder 8 may store an association of a delta operator and a data field identifier for each field in field operator cache 12.

In the current example, user 42 may provide a first group of input values 14 to application 4 via interface 6 to generate a first purchasing message 160. Encoder module 8 may receive the first group of input values 14. First group of input values 14 may include one or more input values to be included in first purchasing message 24. First group of input values 14 may further include data that identifies each input value. For example, first group of input values 14 may include data, e.g., "ORDER_ID", that identifies input value 16. This identifying data may be used by encoder module 8 to store the input value in an appropriate data field of a message based on the message description.

Upon receiving first group of input values 14, encoder module 8 may determine from first group of input values 14 that user 42 wishes to generate a purchasing message. Consequently, encoder module 8 may initially select the message description required generate a first purchasing message 220. First purchasing message 220 may include ORDER_ID field 224A, TICKER field 224B, PRICE field 224C, and QUANTITY field 224D.

In the current example, encoder module 8 may query field operator cache 12 to determine if any data fields of first message 220 are associated with field operators. In response to the query, encoder module 8 may identify that data fields 224A-224D are associated with a delta operator. Because field operator cache 12 provides encoder module 8 with knowledge of data fields that are associated with the delta operator, encoder module 8 may further determine if redundant input values may be removed from message 220. Consequently, encoder module 8 may further query input value cache 10 to determine whether input values from a previously sent purchasing message have been stored in input value cache 10 for each of the ORDER_ID field, TICKER field, and PRICE field. In the current example, no purchasing messages have been generated prior to first purchasing message 24. Thus, the delta operator compression technique may not be applicable when encoding message 220. Consequently, input values 226A-226D for the ORDER_ID field, TICKER field, PRICE field, and QUANTITY field may be included in message 222. In addition, encoder module 8 may set the values of presence map 222 for data fields 224A-224D to '1' because each data field stores an input value in message 220.

In the current, example, user 42 may wish to generate a second purchasing message 228. User 42 may subsequently provide a second group of input values 18 to application 4 via interface 6. Encoder module 8 may receive the second group of input values 18 from interface 6 and initially select the message description to generate the second purchasing message 228. Second purchasing message 228 will include the same data fields as first purchasing message 220 because each purchasing message is generated from the same message description for purchasing securities. Thus, second purchasing message 228 may include ORDER_ID field 230A, TICKER field 230B, PRICE field 230C, and QUANTITY field 230D that include input values 232A-232D, respectively.

Upon receiving second group of input values 18, encoder module 8 may query field operator cache 12 to determine if any data fields of first message 220 are associated with field operators. In response to the query, encoder module 8 may identify that each field 230A-230D is associated with a delta operator. Because field operator cache 12 provides encoder module 8 with knowledge of data fields that are associated with the delta operator, encoder module 8 may further determine if redundant data may be omitted from second purchasing message 228. Consequently, encoder module 8 may query input value cache 10 to determine whether input values from a previously sent purchasing message, e.g., first purchasing message 220, have been stored in input value cache 10 for the ORDER_ID field.

In the current example, first purchasing message 220 has been generated prior to second purchasing message 228. Moreover, the input values of first purchasing message 220 have been stored in input value cache 10. Thus, the delta operator compression technique may be applied to each field of message 228. To perform the delta operator compression technique, encoder module 8 may, for example, select the input value associated with the TICKER field that was stored in input value cache 10 during generation of first purchasing message 220. As shown in FIG. 1, input value 234 ("QFT") was stored in input value cache 10 when first purchasing message 220 was generated by encoder module 8. Encoder module 8, now encoding second purchasing message 228, may select input value 236, i.e., "QQFT," and compare it to the previous input value of the TICKER field stored in input value cache 10. Because input value 236 shares some of the same data as input value 234, encoder module 8 may omit the data shared between input value 234 and input value 236 from TICKER data field 230B. Instead, only the data that differs between input value 236 and input value 236 is included in TICKER data field 230B.

In the current example, only the "Q" character that different between input values 234, 236 is stored in TICKER data field 230B. Thus, the delta operator compression technique enables encoder module 8 to omit the characters "QFT" from second message 228 because it is redundant data. As shown in FIG. 7, the delta compression technique may be applied to each data field of message 228.

In the current example, encoder module 8 may also set the presence map value of presence map 230 corresponding to each field to '0.' Setting the presence map value to '0' may indicate to a decoding module, e.g., executing on remote server 40, that the input value of each field is actually data that differs between the input value sent in the previous purchasing message, i.e., first purchasing message 220 and the input value sent in second purchasing message 228. In this way, input values of second group of input values 18 may be communicated to remote server 40 while omitting redundant data in second purchasing message 228. Consequently, the delta operator compression technique applied by encoder module 8 eliminates redundant data from second message 228 while still communicating the appropriate input values to remote server 40.

As shown in FIG. 7, the delta operator may be used with input values of various, different data types. For example, an input value may be an integer. When the delta operator compression technique is applied to two integer input values, the resulting value encoded in a message may be the difference between the two integer input values. Similar techniques may be applied to floating point values. For example, a first input value may be 10.9 and a second, subsequent input value may be 12.7. Applying the delta operator compression technique may yield a difference of 1.8, which may be included in a second, subsequent message.

The delta operator may also be applied to strings. For examples, as shown in FIG. 7, the delta operator compression technique may be applied to input values "QFT" and "QQFT." In such examples, the delta compression technique may compare the two input values to determine first input value "QFT" differs from second input value "QQFT" by a character "Q." Consequently, as shown in FIG. 7, the "Q" character may be stored in message 228. In some examples, the message description may indicate whether a difference between two strings may be appended to the beginning of a previously sent string or the end of a previously sent string to generate the second input value. For example, a message description may specify that the difference between "QQFT" and "QFT", e.g., "Q" may be appended to the beginning of the previously sent message to generate the second input value.

In some examples, the delta operator may be applied to byte values. In such examples, an encoder may receive a first input value and a second input value. To identify differences between a first input value and a second input value, an encoder module may perform an Exclusive Or (XOR) operation to identify differences between a first input value and a second input value. Applying an XOR operator to the first input value and the second input value may identify the differences between the first input value and the second input value. Consequently, these differences may be included in a second, subsequence message. A decoder module may use the differences included in the second subsequence message to generate to the second input value based on the previous, first input value. The use of the XOR operation to determine the differences between byte values may be defined in a message description. Thus, in some examples, a message description may include data indicating the XOR operation is associated with a data field. Furthermore, the data field may further be associated with delta operator. In this way, a technique used to identify differences between two values may be specified in a message description.

As can be seen in the current example, aspects of the present disclosure may provide a user friendly application programming interface (API) to encode input values using the delta operator. Techniques of the present disclosure may thus allow a user to set the intended input value via the API and the encoder may automatically apply the delta operator compression technique. Moreover, the encoder, when applying the delta operator compression technique may perform, as described above, a pre-encoding check to identify duplicate data for the delta operator and accordingly set values in the presence map of a message. This pro-active detection and setting of the presence map may preclude the transmission of redundant financial data.

Figure 8:
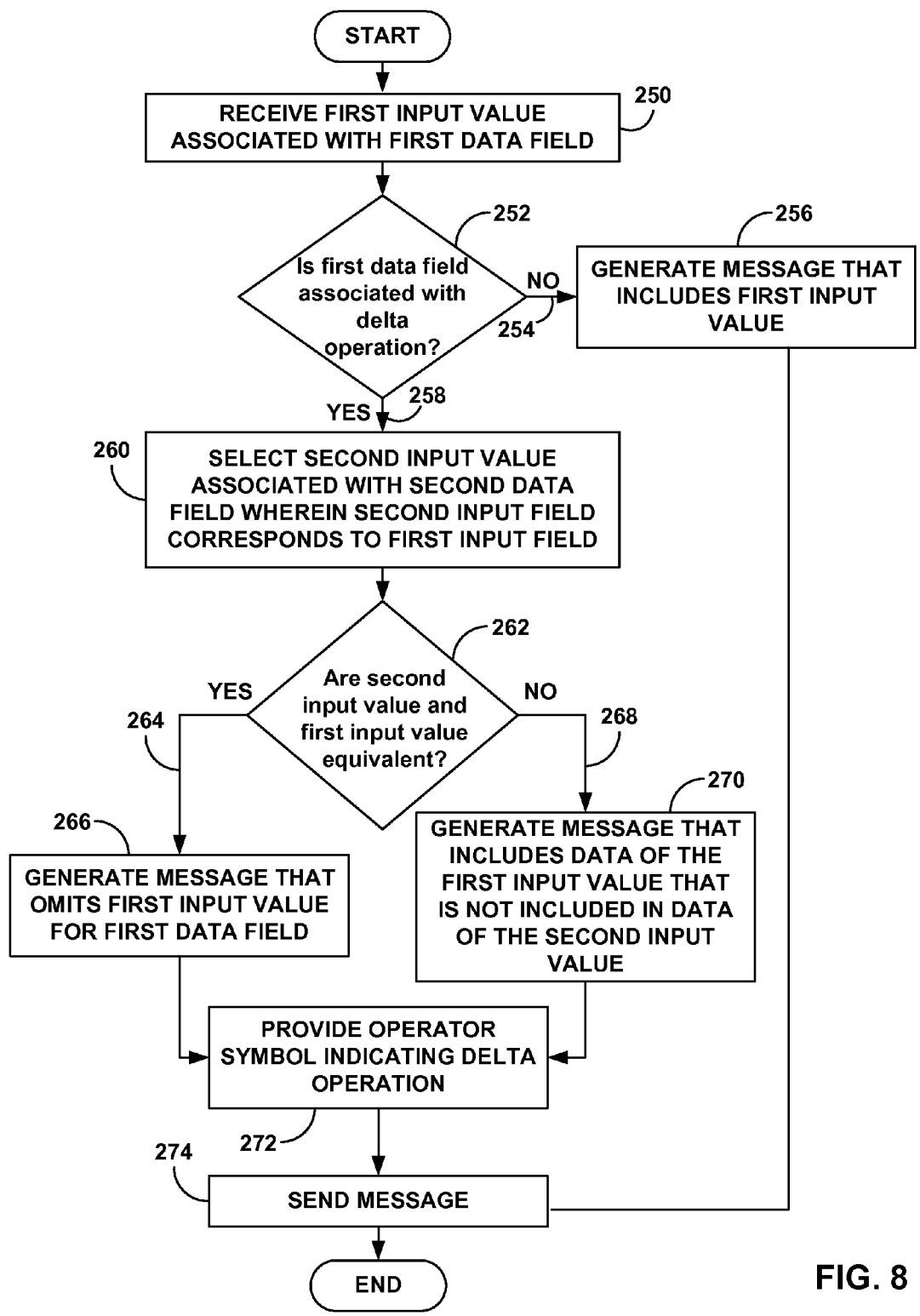
FIG. 8 is a flow diagram illustrating an example method that may be performed by a computing device to encode a message using an increment operator, in accordance with one or more aspects of the present disclosure.

FIG. 8 is a flow diagram illustrating an example method that may be performed by a computing device to encode a message using an increment operator, in accordance with one or more aspects of the present disclosure. For example, the method illustrated in FIG. 8 may be performed by computing device 2 shown in FIGS. 2 and/or 7.

As shown in FIG. 8, the method includes receiving a first input value associated with a first data field. For example, a user may provide an input value via a GUI of a trading application. An encoding module may receive the input value via the GUI (250). The input value may be associated with a first data field of a message. The encoding module may then determine whether the first data field is associated with a delta operator (252). For example, the encoder module may query a field operator cache as described in FIG. 1 to identify whether the first data field is associated with the increment operator. If the encoder module determines the data field is not associated with a increment operator (254), the encoder module may proceed to generate a message that includes the first input value (256). If, however, the data field is associated with a delta operator the encoder will proceed to automatically apply the delta operator compression technique (258).

As shown in FIG. 8, the method may continue to element 260 wherein the encoder module selects a second input value associated with a second data field and the second data field corresponds to the first input field. In one example, the second input value may correspond to the input value stored in an input value cache as described in FIGS. 1 and 7. Furthermore, the second data field may refer to a data field of a previously sent message. The first data field of the current message may correspond to the second data field such that the first data field of the current message is the same as the second data field of the previously sent message. As described in FIGS. 1 and 7, the encoder module may select the second input value from the input value cache based on a data field identifier.

Upon selecting the second input value, encoder module may compare the second input value, e.g., the previously sent input value, and the first input value, e.g., the current input value to determine second input value and first input value are equivalent (262). If the input values are equivalent (264), the encoder module may proceed to generate a message that omits the first input value from the first data field (266). The encoder module may omit the first input value because the data of the first input value and the second input value are the same. Stated another way, because the delta operator compression is applied to the first data field and no differences are present between the first input value and the second input value, no data may be stored in the first data field.

In some examples, the input values may not be equivalent (268). In such examples, the encoder module may generate a message that includes data that reflects the differences between the first input value and the second input value (270). Thus, in some examples, redundant data can be eliminated from a message by sending only data that is different between the first input value and the second input value.

As shown in FIG. 8, upon generating a message, the encoder module may proceed to provide an operator symbol indicating a delta operation (272). In one example, providing operator symbol that indicates an equivalence operation may include setting a value of a presence map to a value that indicates the delta operator. In some example, the value of the presence map may be set to '0' to indicate the decoding module should interpret the data for the first data field as data that indicates the differences between the first input value and the second input value. In some examples, the message may be sent by the encoding module to a remote server that includes a decoder module (274).

Figure 9:
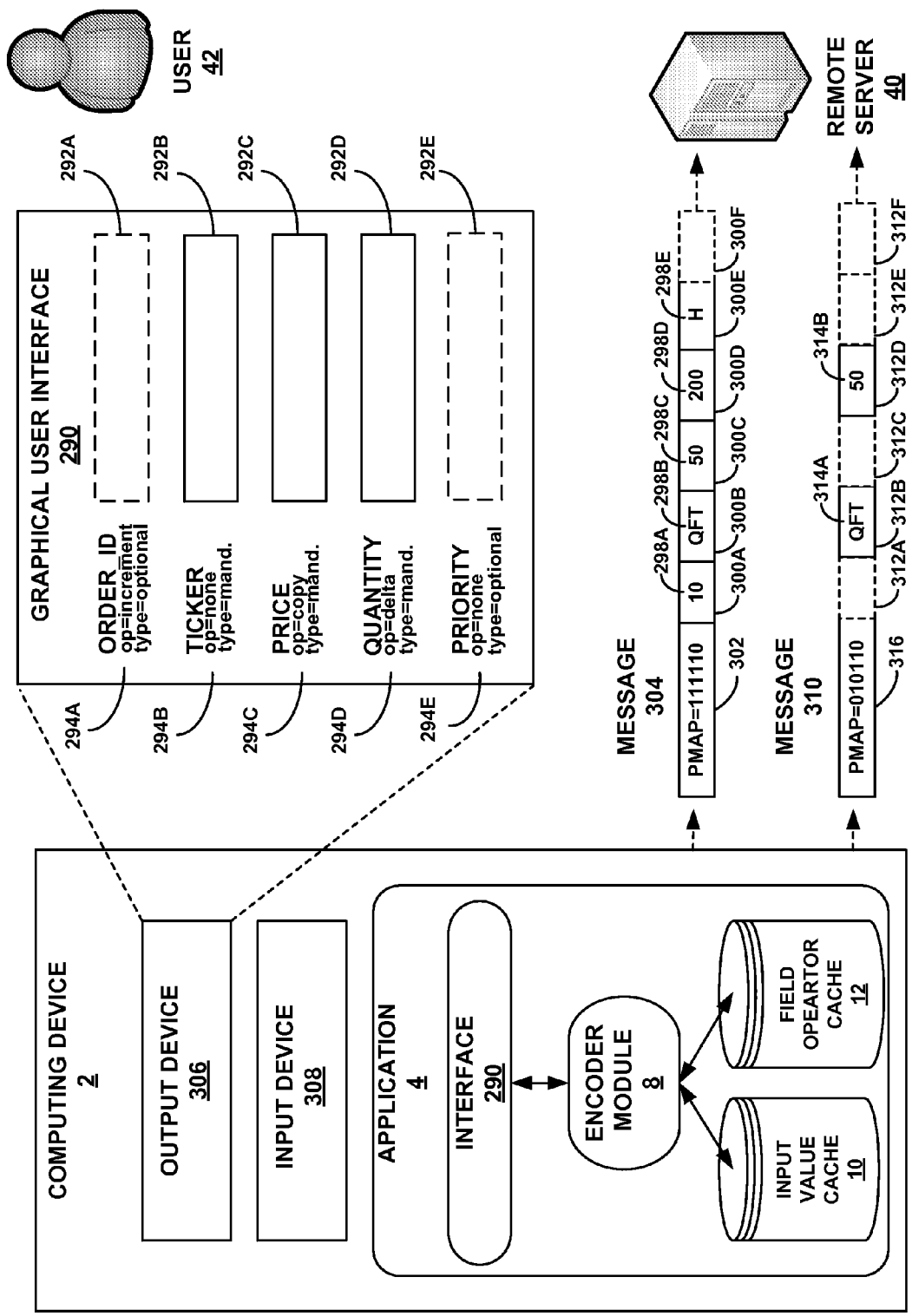
FIG. 9 is a block diagram of an example computing device that implements one or more skip field operations, in accordance with one or more aspects of the present disclosure.

FIG. 9 is a block diagram of a computing device that implements one or more skip field operations, in accordance with one or more aspects of the present disclosure. As shown in FIG. 9, computing device 2 includes similar features and characteristics as shown in FIGS. 1 and 2 unless further described hereinafter. For example, computing device 2 includes an output device 306 (e.g., an LCD display), input device 308 (e.g., a keyboard), and a trading application. 4. Application 4 may further include interface 290, encoder module 8, input value cache 10, and field operator cache 12.

As shown in FIG. 9, a user 42 may provide input values using graphical user interface (GUI) 290. For example, GUI 290 may present visual content such as text boxes, labels, and buttons to provide input values. GUI 290, as shown in FIG. 9, may enable user 42 to purchase securities. For example, GUI 290 may include text boxes 292A-292E which receive input values from user 42. Furthermore, GUI 290 may include labels 294A-294E associated with text boxes 292A-292E, respectively. In some examples, labels 294A-294E may provide information to user 42 about text boxes 292A-292E. Output device 306, in some examples, may display GUI 290. Furthermore, in some examples, user 42 may use input device 308 to provide input values via GUI 290.

As shown in previous examples of FIGS. 1-8, a user may provide input values that are encoded and sent in messages. In some examples, encoder 8 may use various field operators to automatically and seamlessly eliminate redundant data from messages. FIG. 9 illustrates another technique to automatically and seamlessly eliminate redundant data from messages using optional and mandatory data fields. In some examples, a data field of a message may be configured as optional or mandatory. A data field may be designated as optional, when the data field does not require an input value to generate a message. In contrast, a mandatory data field requires an input value to generate a message. In some examples, a data field may be defined as optional or mandatory in a message description. For example, a mandatory identifier or optional identifier may be associated with a data field in a message description to indicate whether the data field is optional or mandatory. Consequently, when encoder module 8 generates and encodes a message, encoder module 8 may use the message description to determine whether a data field is optional or mandatory.

Optional and mandatory data field designations may be particularly beneficial when a user, e.g., user 42 wishes to quickly enter input values in GUI 290. In one example, encoder module 8 may require user 42 to provide an input value for each mandatory field. When a user provides an input value for a mandatory field, techniques of the present disclosure as described in FIGS. 1-8 may be used by an encoder module to generate a message using the provided input value. In some examples, however, user 42 may "skip," e.g., not provide an input value for, each mandatory field of a message. When user 42 skips an optional field, GUI 290 and/or application 4 may generate information associated with the skipped optional data field. This information may indicate, e.g., that the skipped mandatory data field does not include data. In some examples, if no field operator is associated with the skipped mandatory data field, encoder module 8 may require user 42 to enter an input value associated with the data field. If, however, a field operator is associated with the skipped mandatory data field, encoder module 8 may automatically and seamlessly apply techniques of the present disclosure as described in FIGS. 1-8 as further described below.

In other examples, encoder module 8 may enable user 42 to skip an input value for an optional field. When a user provides an input value for an optional field, techniques of the present disclosure as described in FIGS. 1-8 may be used by an encoder module to generate a message using the provided input value. In other examples, when user 42 skips an optional field, GUI 290 and/or application 4 may generate information associated with the skipped optional data field. This information may indicate, e.g., that the skipped optional data field does not include data. In such examples, encoder module 8, using this information, may automatically determine a particular action to take with respect to the optional field, e.g., applying a field operator technique to the optional field. In one example, information may include a map, variable, or other data storage element that may store a symbol indicating data field includes or does not include data. For example, encoder module 8 may determine whether to include an input value in the optional field of a message based on a pre-defined operator, e.g., a field operator, associated with the optional data field. In such examples, encoder module 8 may use techniques of the present disclosure as described in FIGS. 1-8 to generate the corresponding message. Thus, in some examples, the input value may be an input value previously stored in input value cache 10.

As shown in FIG. 9, encoder module 8 may automatically apply a field operator technique to an optional field when no input value is provided by user 42. In the example of FIG. 9, user 42 may generate a first purchasing message 304 and a second purchasing message 310 to purchase securities. Each message may be generated based on the same message description. GUI 290 may enable user 42 to enter input values that specify the input values of the securities purchase. For example, GUI 290 may enable user 42 to provide an order identifier associated with the purchase, a ticker symbol of the security to be purchased, the purchase price of the security, the quantity of that security to be purchased, and the priority of the securities purchase, e.g., low, medium, or high.

As shown in FIG. 9, user 42 may generate first purchasing message 304 that includes data fields 300A-300F. Input values provided via GUI 290 in text boxes 292A-292E may correspond to data fields 300A-300E of message 304. In the current example, user 42 may provide the following input values 298A-298E: an order identifier of "10" (298A), a ticker symbol "QFT" (298B), a price "$50" (298C), a quantity "200" (298D), and a priority "H" (298E) to indicate High priority on a scale of Low, Medium and High. Data field 300F may be empty and correspond to a constant value that identifies user 42. In some examples, a constant operator may be associated with a data field, e.g., data field 300F, in a message description. In such examples, a constant value is defined in the message description and further associated with data field 300F. Encoder module 8 may, when encoding a message, omit the constant value to eliminate redundant data from a message and set the value of the presence map 302 corresponding to data field 300F to '0'. A decoder module that subsequently receives the message may determine, using the message description and the presence map value, that the input value of data field 300F is equal to the constant value. As shown in FIG. 9, user 34 may generate message 304 as described herein and send it to remote server 40 which may decode message 304.

As shown in FIG. 9, user 42 may subsequently generate a second purchasing message 310 that includes data fields 312A-312F. Second purchasing message 310 may be encoded with the same message description as first purchasing message 304 and therefore include the same data fields. Consequently, data fields 312A-312F may correspond to data fields 300A-300F of first purchasing message 304. Furthermore, input values provided by user 42 in text boxes 292A-292E of GUI 290 may be associated with data fields 312A-312E of second purchasing message 310.

Optional and mandatory data fields may be further illustrated in FIG. 9 when encoder module 8 generates second purchasing message 310. In the current example, ORDER_ID field 298A and PRIORITY field 298E may be optional. As indicated in FIG. 9 by label 294A, ORDER_ID field 312A may be optional (type=optional) and may further be associated with an increment field operator as described in FIGS. 5-6. As indicated by label 294A in FIG. 9, PRIORITY field 312E is also an optional field (type=optional), but may not be associated with any operator. Because each of fields ORDER_ID 312A and PRIORITY field 312E are optional, user 42 may skip, e.g., not provide input values, each field.

In the current example, when user 42 skips ORDER_ID field 312A, encoder module 8 may perform one or more actions. For example, encoder module 8 may initially determine that ORDER_ID field 312A is optional using, e.g., a message description. Consequently, because ORDER_ID field 312A is optional, encoder module 8 may not require user 42 to provide an input value. Upon determining that ORDER_ID field 312A is optional, encoder module 8 may query field operator cache 12 to determine if ORDER_ID field 312A is associated with a field operator. In the current example, encoder module 8 determines that ORDER_ID field 312A is associated with an increment operator.

Continuing with the current example, in response to determining ORDER_ID field 312A is associated with an increment operator, encoder module 8 may automatically apply the increment operator compression technique to ORDER_ID field 312A as described in FIGS. 5 and 6. Consequently, if a previously encoded input value has been stored in input value cache 10, encoder module 8 may automatically determine that the input value for skipped ORDER_ID field 312A is the sum of an increment value and the previously encoded input value stored in input value cache 10. Thus, the input value for skipped ORDER_ID field 312A may be omitted, and presence map 316 of message 310 may indicate that the increment operator compression technique may be applied to ORDER_ID field 312A.

In some examples, when a user skips an optional data field and no field operator is associated with the optional data field, encoder module 8 may assign no value to the optional data field. For example, as shown in FIG. 9 user 42 may not enter an input value text box 292E that corresponds to PRIORITY data field 312E. Encoder module 8 may determine, based on a message description, that data field 312E is optional and furthermore that no field operator is associated with data field 312E. Consequently, encoder module 8 may, in some examples, assign no input value to data field 318E. Furthermore, encoder module 8 may set the value of presence map 316 that corresponds to PRIORITY data field 312E to '1' in order to indicate that no field operator is associated with field 312E. In this way, a decoder module that decodes message 310 may determine that no value is included in field 312E.

In an alternative example, when a user skips an optional data field and no field operator is associated with the optional data field, encoder module 8 may assign a default value to optional data field. In some examples, a message description may define a default value that may be applied to the optional data field when the user does not provide an input value. For example, in the prior use case, a message description may indicate a default priority value of Medium for the PRIORITY data field. Thus, when user 42 does not provide an input value for PRIORITY field 312E and a default value is specified in the message description, encoder module 8 omit data for PRIORITY field 312E. Encoder module 8 may also set a value of presence map 316 that corresponds to field 312E to '0' to indicate that a decoder module may use the default value specified in the message description as the input value for field 312E. In this way, the default value may be communicated from computing device 2 to remote server 40 without storing the default value in message 310.

As shown in FIG. 9, in some examples, when user 42 skips a mandatory data field and a field operator is associated with the mandatory data field, encoder module 8 may automatically and seamlessly apply techniques of the present disclosure as described in FIGS. 1-8 to the skipped, mandatory data field. For example, PRICE fields 300C and 312C of messages 304 and 301, respectively, may each be associated with a copy operator. As shown in FIG. 9, fields 300C and 312C may each store input values received via text box 292C. Label 294C indicates to user 42 that fields 300C and 312C are mandatory fields and are further associated with a copy operator.

In one example, user 42 may generate first purchasing message 304 and include price input value 298C, e.g., "50", in message 304. In accordance with techniques described in FIGS. 1-4, encoder module 8 may store input value 298C in input value cache 10. Furthermore, first message 304 may be the first message generated by encoder module 8 in a current session and therefore the copy operator technique may not be applicable. First purchasing message 304 may be subsequently sent to remote server 40.

At a later time, user 42 may generate a second purchasing message 310. User 42, when generating message 310, may skip PRICE text box 292C, e.g., user 42 may not provide an input value associated with PRICE text box 292C. In response to skipping PRICE text box 292C, encoder module 8 may initially determine that PRICE field 312C is associated with a mandatory identifier. Because PRICE field 294C is mandatory and user 42 provided no corresponding user input, encoder module 8 may automatically determine if a field operator is associated with PRICE field 312C. As previously described, PRICE data field 312C is associated with a copy operator, which encoder module 8 may determine by querying field operator cache 12. Encoder module 8, in response to determining PRICE data field 312C is associated with a copy operator, may query input value cache 10 as described in FIGS. 1-4 to identify a previously stored input value that may be associated with, e.g., PRICE field 300C. In the current example, PRICE input value 298C, e.g., "50" was previously stored in input value cache 10. Consequently, in the current example, encoder module 8 may apply the copy operator compression technique to field 312C. Thus, when message 310 is later decoded, the decoder may determine that input value of PRICE field 312C is "50" in accordance with the previously sent PRICE input value 298C of message 304.

In some examples, encoder module 8 may further include a state machine (not shown) to verify if a data field may be skipped. For example, a state machine may include associations between mandatory/optional identifiers and data fields. In one example, encoder module 8 may use the state machine to determine if a data field is associated with an optional or mandatory identifier. If the state machine indicates the data field is associated with a mandatory identifier, encoder module 8 may require an input value to generate a message. In other examples, if the state machine indicates a data field is associated with an optional identifier, encoder module 8 may not require an input value from the user to generate a message. Instead, encoder module 8 may use techniques described herein to generate the message.

As can be seen in the current example, aspects of the present disclosure may provide a user friendly application programming interface (API) to allow a user to skip one or more fields and set the next field value. Techniques of the present disclosure may thus allow a user to set the input value via the API and the encoder may automatically apply the appropriate compression technique, e.g., based on an optional or mandatory identifier. Moreover, the encoder, when applying a corresponding operator compression technique may perform, as described above, a pre-encoding check to identify optional and mandatory fields, and accordingly set values in the presence map of a message. This pro-active detection and setting of the presence map may preclude the transmission of redundant financial data and may facilitate generation of messages that comply with financial messaging protocols.

Figure 10:
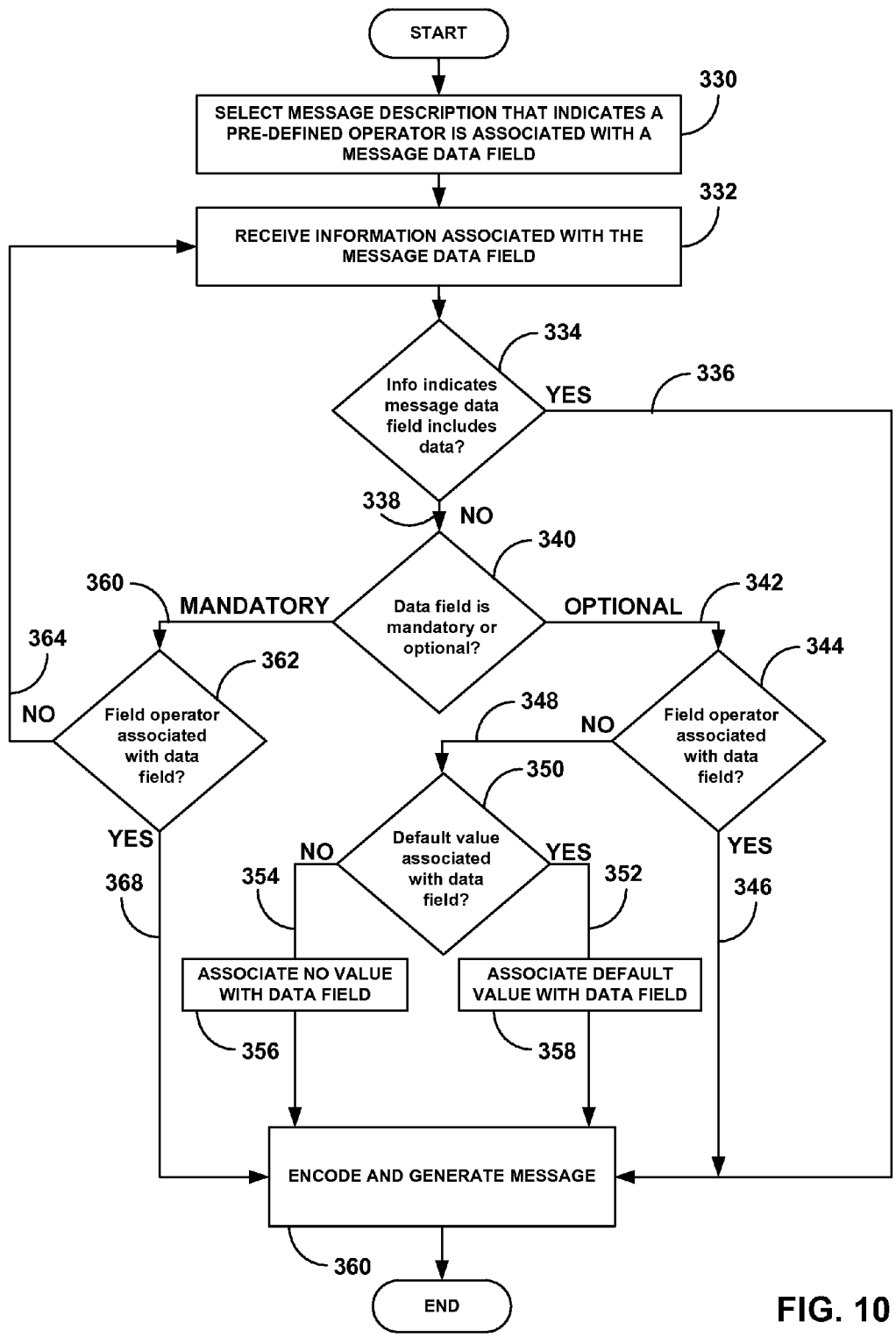
FIG. 10 is a flow diagram illustrating an example method that may be performed by a computing device to encode a message using a skip field technique, in accordance with one or more aspects of the present disclosure.

FIG. 10 is a flow diagram illustrating an example method that may be performed by a computing device to encode a message using a skip field technique, in accordance with one or more aspects of the present disclosure. For example, the method illustrated in FIG. 10 may be performed by computing device 2 shown in FIGS. 2 and/or 9.

As shown in FIG. 10, the method includes selecting a message description that indicates a pre-defined operator is associated with a message data field (330). For example, as previously described in FIGS. 1, 2, and 9, a message description may include an operator identifier that identifies a pre-defined operator, e.g., a copy operator. Furthermore the message description may indicate an association between the pre-defined operator and the message data field.

As shown in FIG. 10, the method may include receiving information associated with the message data field (332). In some examples, information associated with the message data field may further include a data storage element capable of storing a symbol that indicates a presence or absence of data associated with a data field. Examples, of a data storage element may be a variable or map, wherein the data storage element may include data that includes a presence or absence of data. In one example, a null value may be data that indicates an absence of data.

The method as shown in FIG. 10, may further include, responsive to determining that the information indicates the message data field does not include data, determining, by the computing device, whether to include, in a second message that is associated with the message description, a data value for the message data field of the second message based on the pre-defined operator that is associated with the message data field. As shown in FIG. 10, an encoder module executing on the computing device may determine whether the information indicates the message data field does not include data (334). When the information indicates the message data field includes data (336), the encoder module may encode the input value associated with the message data field (360).

In some examples, the encoder module may determine the information indicates the message data field does not include data (338). Consequently, the encoder module may proceed to determine whether the message data field is mandatory or optional (340). For example, the encoder module may determine that an optional identifier or mandatory identifier is associated with the message data field. In some examples, the encoder module may perform this determination by searching the contents of a message descriptor.

In some examples, the message data field may be associated with a mandatory identifier (360). In such examples, the encoder module may further determine if the message data field is associated with a field operator (362). In the example method, if field operator is not associated with the mandatory data field, the encoder module may prompt and/or require the user to provide an input value (364). In some examples, if the field operator is associated with the message data field (368), the encoder module may proceed to encode and generate a message using the compression techniques associated with the field operator as described in FIGS. 1-9 (360).

In some examples, the encoder module may determine the message data field is associated with an optional identifier and therefore the message data field is optional (342). The encoder module may further determine whether a field operator is associated with the data field (344). If a field operator is associated with the optional data field (346), the encoder module may proceed to encode and generate a message using the compression techniques associated with the field operator as described in FIGS. 1-9 (360).

In some examples, the encoder module may determine the message data field is not associated with a field operator (348). In such examples, the encoder module may further determine whether a default value is associated with the message data field (350). For example, a default value may be specified in a message descriptor and associated with a message data field. If no default value is associated with a message data field (354), the encoder module may associate no value with the message data field (356). In other examples, if a default value is associated with the message data field (352), the encoder module may associated the default value with the data field (358). In either case, the encoder module may proceed to encode and generate a message that includes the message data field in accordance with aspects of the present disclosure described herein (360).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other embodiments are within the scope of the following claims.

The invention claimed is:

1. A method comprising:
receiving, by a computing device, a first input value associated with a first data field;
responsive to determining that the first data field is associated with an increment operation, selecting, by the computing device, a second input value associated with a second data field of a previously transmitted message sent from the computing device, wherein the second input field corresponds to the first input field;
comparing, by the computing device, the first input value and the second input value to determine if the first input value comprises a sum of the second input value and an increment value; and
when the first input value comprises the sum of the second input value and the increment value,
generating, by the computing device, a message comprising the first data field that omits the first input value for the first data field, and
providing, by the computing device, an operator symbol indicating the increment operation to specify that the first data field of the message is to be associated with the sum of the increment value and the second input value of the second data field of the previously transmitted message.

2. The method of claim 1, further comprising:
storing, by the computing device, the second input value in an input value cache; and
storing, by the computing device, a field identifier that identifies the second data field in the input value cache, such that the second input value is associated with the field identifier.

3. The method of claim 2, wherein comparing the first input value and the second input value further comprises:
   receiving, by the computing device, data that identifies the field identifier;
   selecting, by the computing device, the second input value from the input value cache based on the data that identifies the field identifier; and
   determining, by the computing device, that the first input value comprises the sum of the second input value and the increment value.

4. The method of claim 1, further comprising:
   storing, by the computing device, a data field identifier that identifiers the second data field in a field operator cache; and
   storing, by the computing device, an operator identifier that indicates the increment operation, such that the data field identifier is associated with the operator identifier.

5. The method of claim 1, wherein determining that the first data field is associated with the increment operation further comprises:
   receiving, by the computing device, a first data field identifier that identifies the first data field;
   determining, by the computing device, a lookup operation, wherein the lookup operation selects a second data field identifier stored in a field operator cache, wherein the second data field identifier matches the first data field identifier, and wherein the second data field identifier is associated with an operator identifier that indicates the increment operation;
   in response to selecting the second data field identifier, selecting, by the computing device, the operator identifier; and
   determining, by the computing device, that the operator identifier indicates the increment operation.

6. The method of claim 1, wherein providing the operator symbol indicating the increment operation further comprises:
   generating, by the computing device, a presence map, wherein the presence map comprises one or more operator symbols, wherein each operator symbol of the one or more operator symbols corresponds to a different data field of the message;
   storing, by the computing device, the operator symbol indicating the increment operation in the presence map; and
   storing, by the computing device, the presence map in the message.

7. The method of claim 1, further comprising:
   sending, by the computing device, the message to a remote server, such that the remote server may associate the second input value of the second data field in the previously transmitted message with the first data field of the message based on the operator symbol, and wherein the remote server received the previously transmitted message.

8. The method of claim 1, wherein the first input value includes data comprising a string, byte, integer, or floating point value.

9. The method of claim 1, wherein the increment value further comprises an integer or floating point value.

10. The method of claim 1, wherein a message description comprises an association between the increment value and the first data field.

11. A computing device, comprising:
   an input device to receive a first input value associated with a first data field;
   one or more processors; and
   an encoder module executable by the one or more processors to:
      responsive to determining that the first data field is associated with an increment operation, select a second input value associated with a second data field of a previously transmitted message sent from the computing device, wherein the second input field corresponds to the first input field;
      compare the first input value and the second input value to determine if the first input value comprises a sum of the second input value and an increment value; and
      when the first input value comprises the sum of the second input value and the increment value,
         generate a message comprising the first data field that omits the first input value for the first data field, and
         provide an operator symbol indicating the increment operation to specify that the first data field of the message is to be associated with the sum of the increment value and the second input value of the second data of in the previously transmitted message.

12. The computing device of claim 11, wherein the encoder module is further executable to:
   store the second input value in an input value cache; and
   store a field identifier that identifies the second data field in the input value cache, such that the second input value is associated with the field identifier.

13. The computing device of claim 12, wherein the encoder module is further executable to:
   receive data that identifies the field identifier;
   select the second input value from the input value cache based on the data that identifies the field identifier; and
   determine that the first input value and the second input value are equivalent.

14. The computing device of claim 11, wherein the encoder module is further executable to:
   store a data field identifier that identifiers the second data field in a field operator cache; and
   store an operator identifier that indicates the increment operation, such that the data field identifier is associated with the operator identifier.

15. The computing device of claim 11, wherein the encoder module is further executable to:
   receive a first data field identifier that identifies the first data field;
   determine a lookup operation, wherein the lookup operation selects a second data field identifier stored in a field operator cache, wherein the second data field identifier matches the first data field identifier, and wherein the second data field identifier is associated with an operator identifier that indicates the increment operation;
   in response to selecting the second data field identifier, select the operator identifier; and
   determine that the operator identifier indicates the increment operation.

16. The computing device of claim 11, wherein the encoder module is further executable to:
   generate a presence map, wherein the presence map comprises one or more operator symbols, wherein each operator symbol of the one or more operator symbols corresponds to a different data field of the message;
   store the operator symbol indicating the increment operation in the presence map; and
   store the presence map in the message.

17. The computing device of claim 11, wherein the encoder module is further executable to:
   send the message to a remote server, such that the remote server may associate the second input value of the second data field in the previously transmitted message with the first data field of the message based on the operator symbol, and wherein the remote server received the previously transmitted message.

18. The computing device of claim 11, wherein he first input value includes data comprising a string, byte, integer, or floating point.

19. The computing device of claim 11, wherein the increment value further comprises and integer or floating point value.

20. The computing device of claim 11, wherein a message description comprises an association between the increment value and the first data field.

21. A computer-readable storage device encoded with instructions that, when executed, cause one or more processors of a computing device to:

receive a first input value associated with a first data field;

responsive to determining that the first data field is associated with an increment operation, select a second input value associated with a second data field of a previously transmitted message sent from the computing device, wherein the second input field corresponds to the first input field;

compare the first input value and the second input value to determine if the first input value comprises a sum of the second input value and an increment value; and when the first input value comprises the sum of the second input value and the increment value, generate a message comprising the first data field that omits the first input value for the first data field, and provide an operator symbol indicating the increment operation to specify that the first data field of the message is to be associated with the sum of the increment value and the second input value of the second data field of the previously transmitted message.

\* \* \* \* \*